(12) United States Patent
Scobie et al.

(10) Patent No.: US 7,559,338 B2
(45) Date of Patent: Jul. 14, 2009

(54) KEYLESS FIRE HYDRANT PROTECTION SYSTEM

(75) Inventors: William Bryce Scobie, North Providence, RI (US); Normand James Roy, Coventry, RI (US)

(73) Assignee: Mueller International, Inc., Portsmouth, NH (US)

( * ) Notice: Subject to any disclaimer, the term of this patent is extended or adjusted under 35 U.S.C. 154(b) by 252 days.

(21) Appl. No.: 11/498,695

(22) Filed: Aug. 3, 2006

(65) Prior Publication Data

US 2007/0028967 A1  Feb. 8, 2007

Related U.S. Application Data

(60) Provisional application No. 60/705,338, filed on Aug. 4, 2005.

(51) Int. Cl.
F16K 21/04 (2006.01)
F16K 15/03 (2006.01)

(52) U.S. Cl. .................... 137/527.4; 137/527
(58) Field of Classification Search ........... 137/511, 137/527, 527.4, 527.6, 527.8, 527.2
See application file for complete search history.

(56) References Cited

U.S. PATENT DOCUMENTS

| | | | |
|---|---|---|---|
| 2,083,319 A | 6/1937 | Daviet | |
| 3,276,471 A * | 10/1966 | Hagner | ....................... 137/527 |
| 3,566,905 A | 3/1971 | Noland | |
| 3,935,877 A | 2/1976 | Franceschi | |
| 3,939,861 A | 2/1976 | Thompson | |
| 4,033,372 A | 7/1977 | Bowman | |
| 4,182,361 A | 1/1980 | Oakey | |
| 4,390,038 A | 6/1983 | Salvato | |
| 4,393,891 A | 7/1983 | Snoek et al. | |
| 4,475,570 A | 10/1984 | Pike et al. | |
| 4,566,481 A | 1/1986 | Leopold, Jr. et al. | |
| 4,727,900 A | 3/1988 | Dooling et al. | |
| 4,824,008 A | 4/1989 | Luszcz et al. | |
| 4,909,270 A | 3/1990 | Enterante, Sr. et al. | |
| 5,029,603 A | 7/1991 | Ackroyd | |
| 5,033,501 A | 7/1991 | Stehling | |
| 5,106,052 A * | 4/1992 | Datta et al. | ................... 251/56 |

(Continued)

FOREIGN PATENT DOCUMENTS

DE 236645 7/1911

(Continued)

*Primary Examiner*—John Rivell
*Assistant Examiner*—Atif H Chaudry
(74) *Attorney, Agent, or Firm*—Alston & Bird, LLP

(57) ABSTRACT

The protection system protects a fire hydrant. The protection system includes a nozzle, a protection device, and a bracket assembly. The nozzle defines a bore, is in fluid communication with an interior of the fire hydrant, and is adaptable to receive a fire hose. The protection device is carried by the bore of the nozzle for prohibiting access into the interior of the fire hydrant from the exterior. The protection device includes a first position for preventing access into the fire hydrant from the exterior, and a second position wherein water can flow from inside the fire hydrant externally via the nozzle. The bracket assembly is coupled to the protection device for rotating the protection device and carried by the nozzle, wherein the bracket assembly has sufficient rotational travel for enabling the protection device to move from the first position to the second position, depending on the water pressure.

8 Claims, 22 Drawing Sheets

U.S. PATENT DOCUMENTS

| | | |
|---|---|---|
| 5,129,416 A | 7/1992 | Ackroyd |
| 5,205,312 A | 4/1993 | Jerman et al. |
| 5,330,157 A * | 7/1994 | Dern et al. ................ 251/162 |
| 5,383,495 A | 1/1995 | Kennedy |
| 5,469,724 A | 11/1995 | Pollard |
| 5,520,210 A | 5/1996 | Barton |
| 5,596,893 A | 1/1997 | Stehling et al. |
| 5,662,202 A | 9/1997 | Suris |
| 5,727,590 A | 3/1998 | Julicher et al. |
| 6,401,745 B1 | 6/2002 | Corder |
| 6,868,860 B2 | 3/2005 | Davidson |
| 6,901,950 B1 | 6/2005 | Burt et al. |
| 6,910,495 B2 | 6/2005 | Lafalce |
| 6,994,106 B1 | 2/2006 | Hackley et al. |
| 7,040,342 B1 | 5/2006 | Stehling et al. |
| 7,055,544 B2 | 6/2006 | Davidson |
| 7,174,911 B2 | 2/2007 | Davidson |
| 7,240,688 B2 | 7/2007 | Davidson, Sr. et al. |
| 2004/0154659 A1 * | 8/2004 | Lafalce ..................... 137/218 |

FOREIGN PATENT DOCUMENTS

| | | |
|---|---|---|
| EP | 0113913 | 3/1986 |
| EP | 1010821 | 6/2000 |
| EP | 1010822 | 6/2000 |

\* cited by examiner

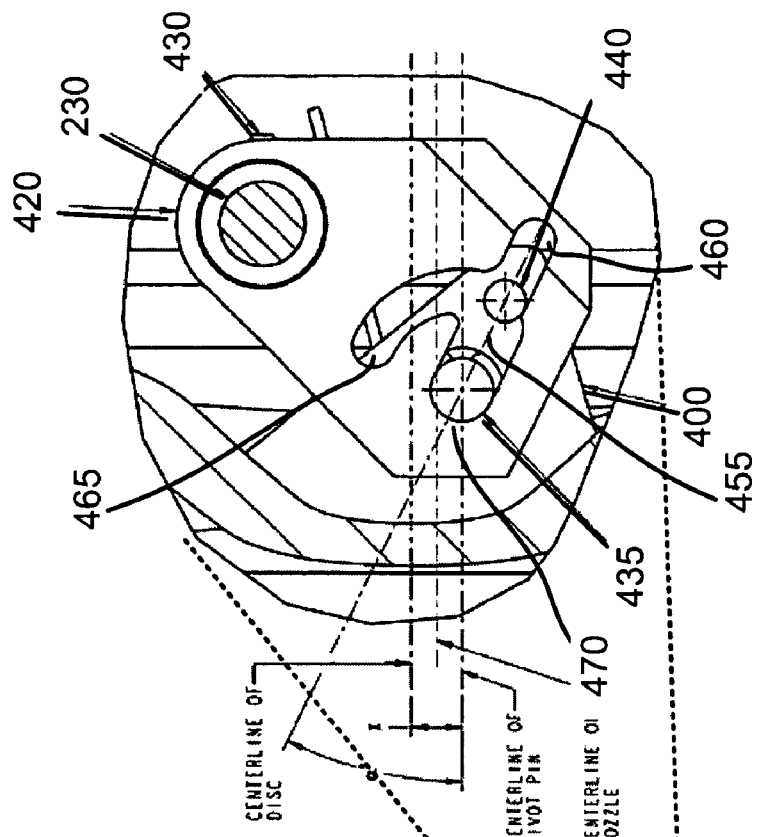
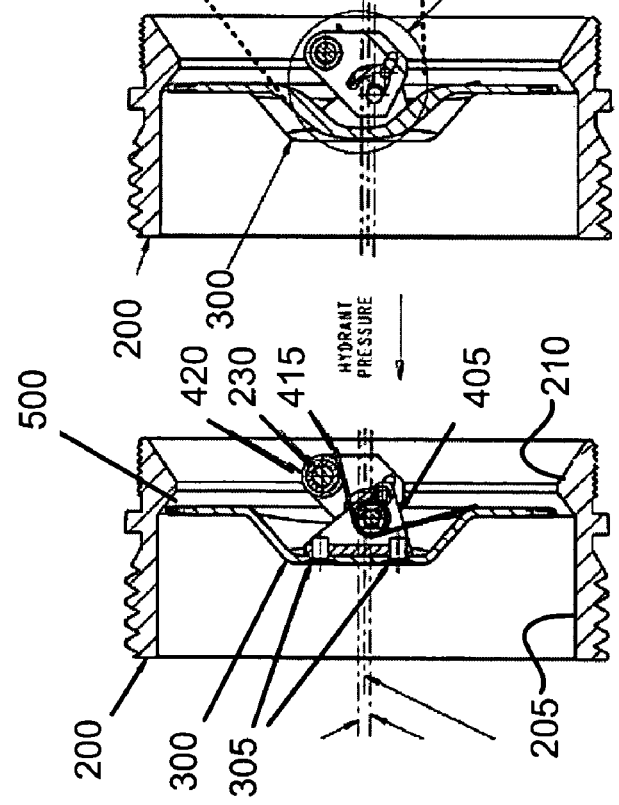
Fig. 4B
Fig. 4A

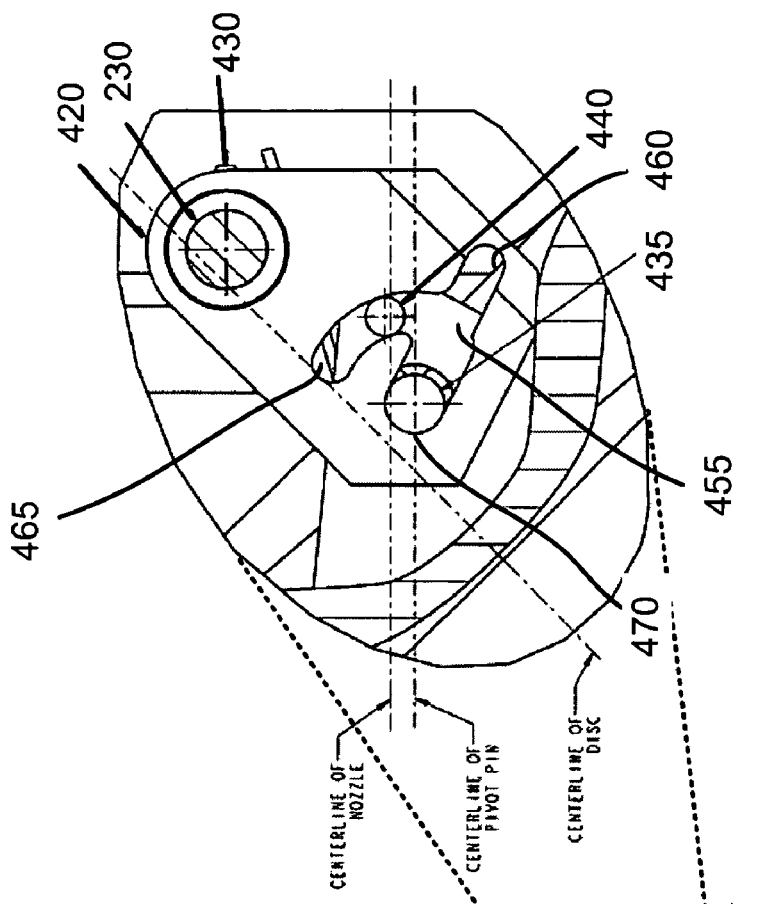
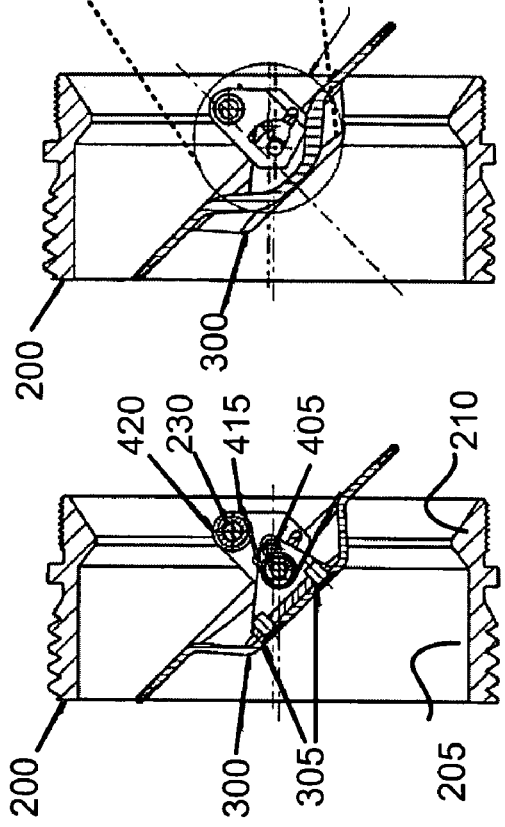
Fig. 5A
Fig. 5B

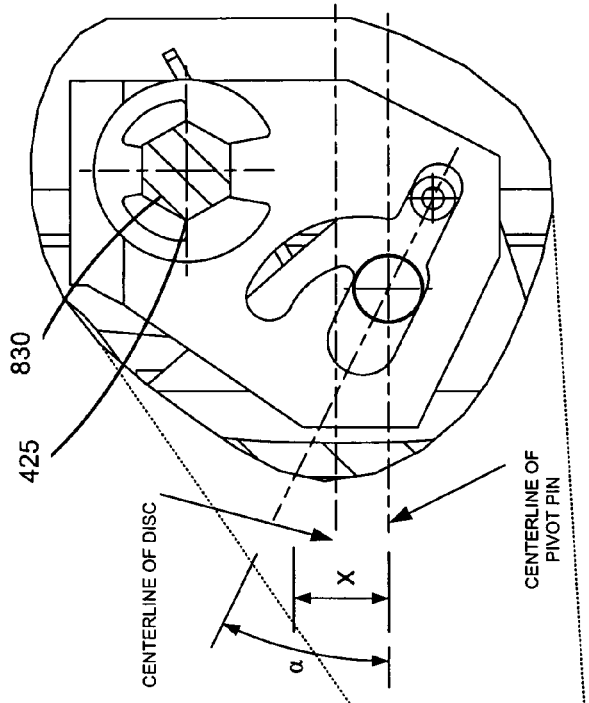
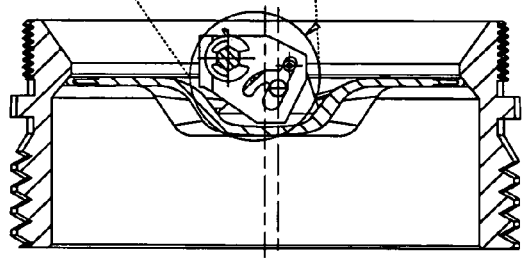
Fig. 9B
Fig. 9A

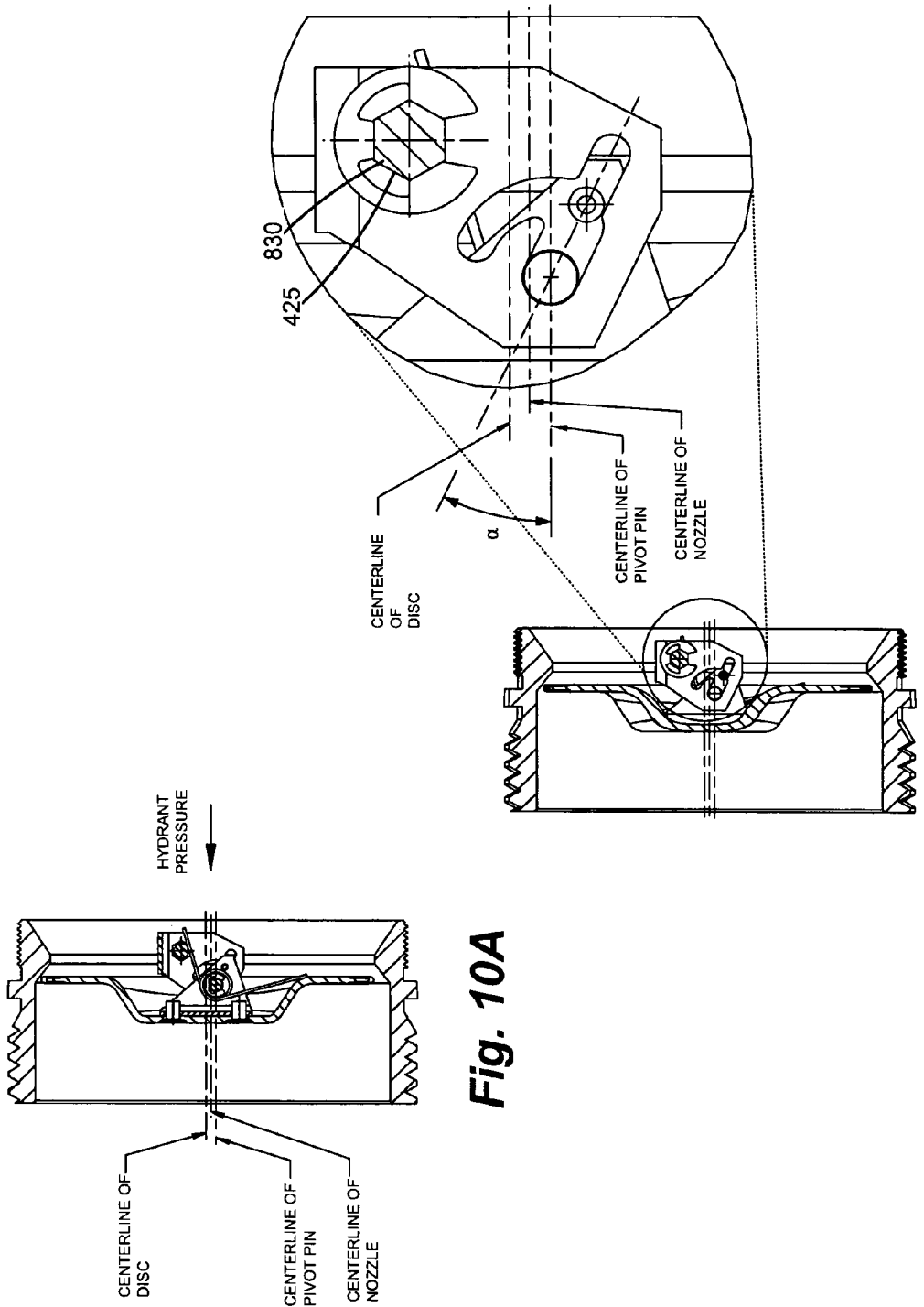

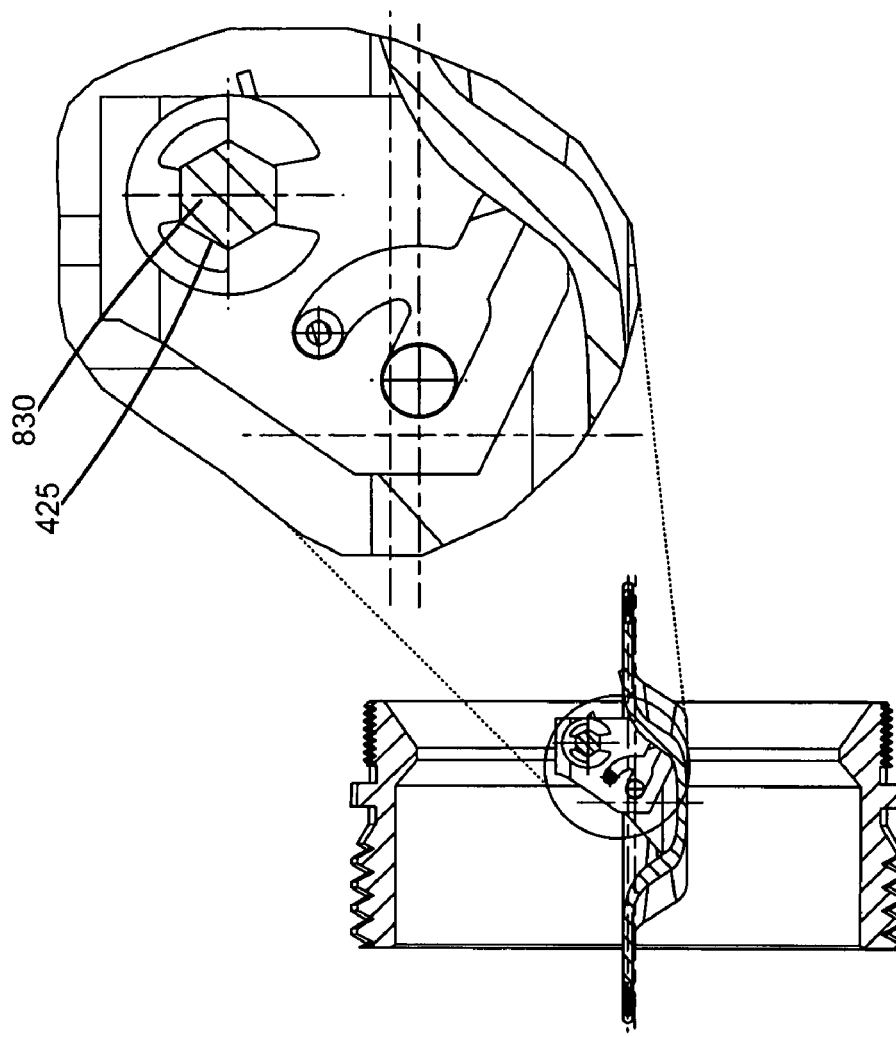
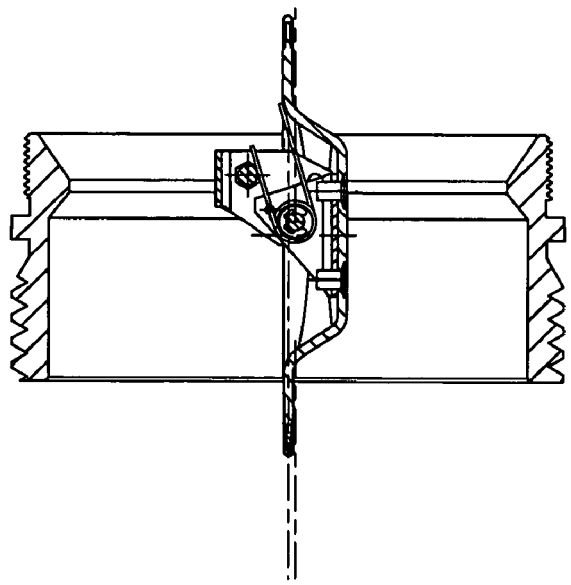
*Fig. 12B*
*Fig. 12A*

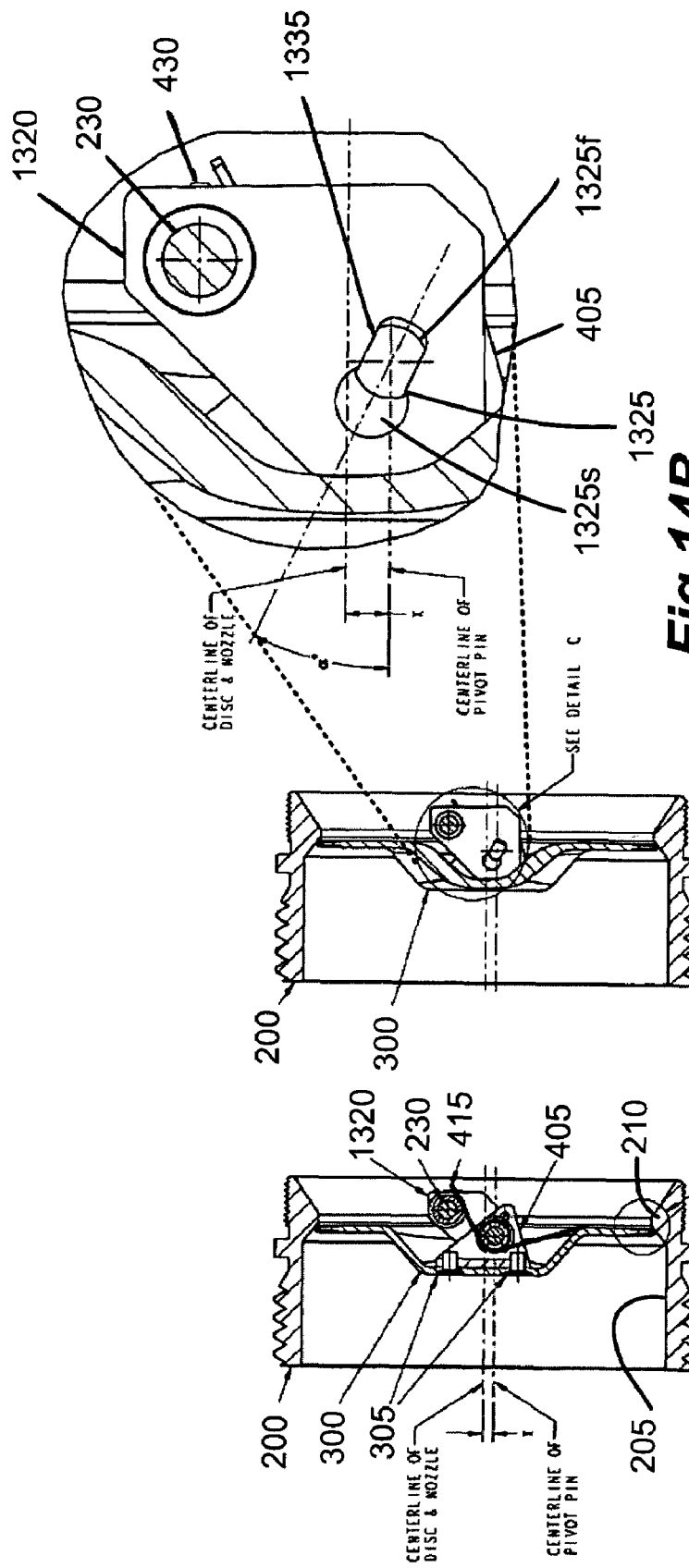

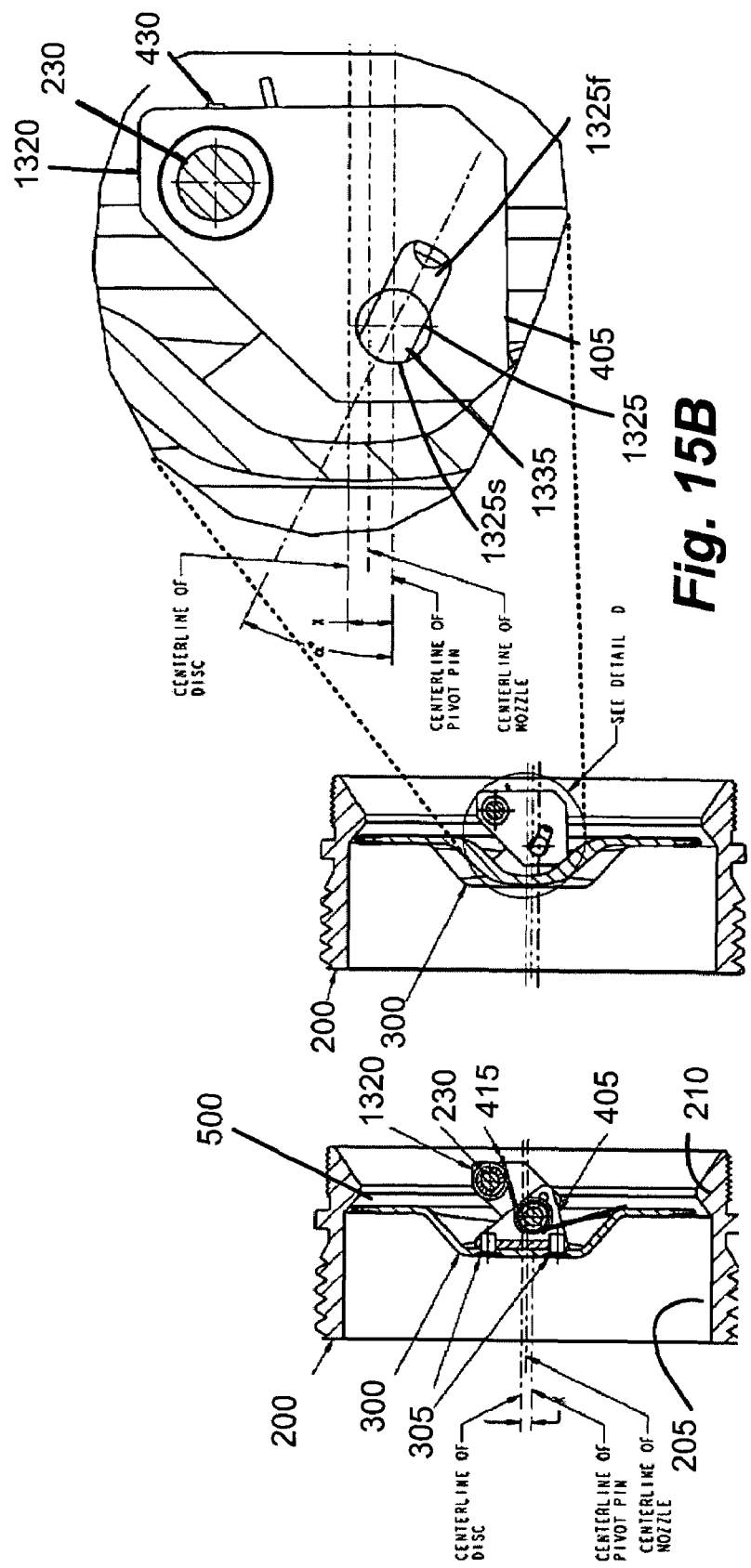

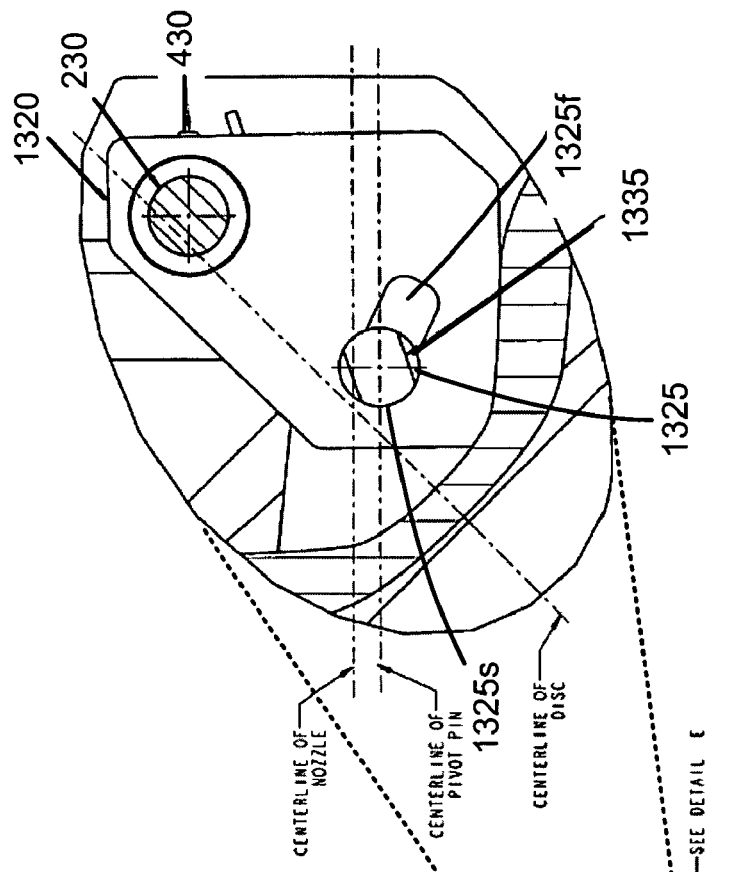
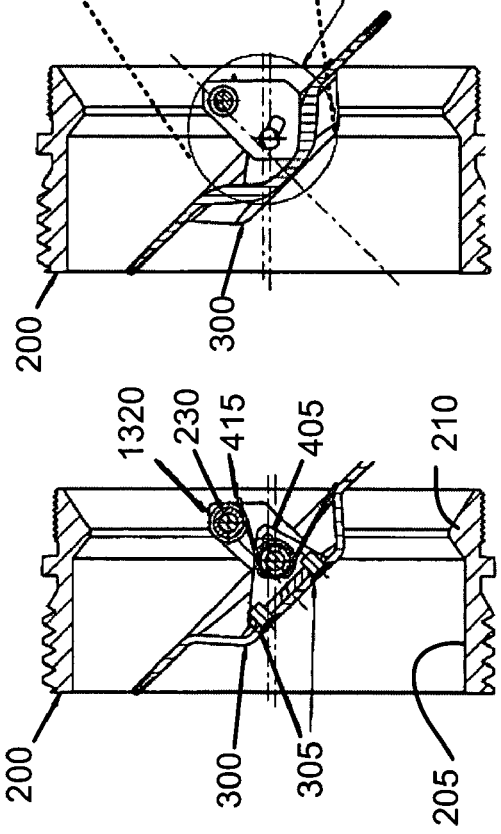
Fig. 16B
Fig. 16A

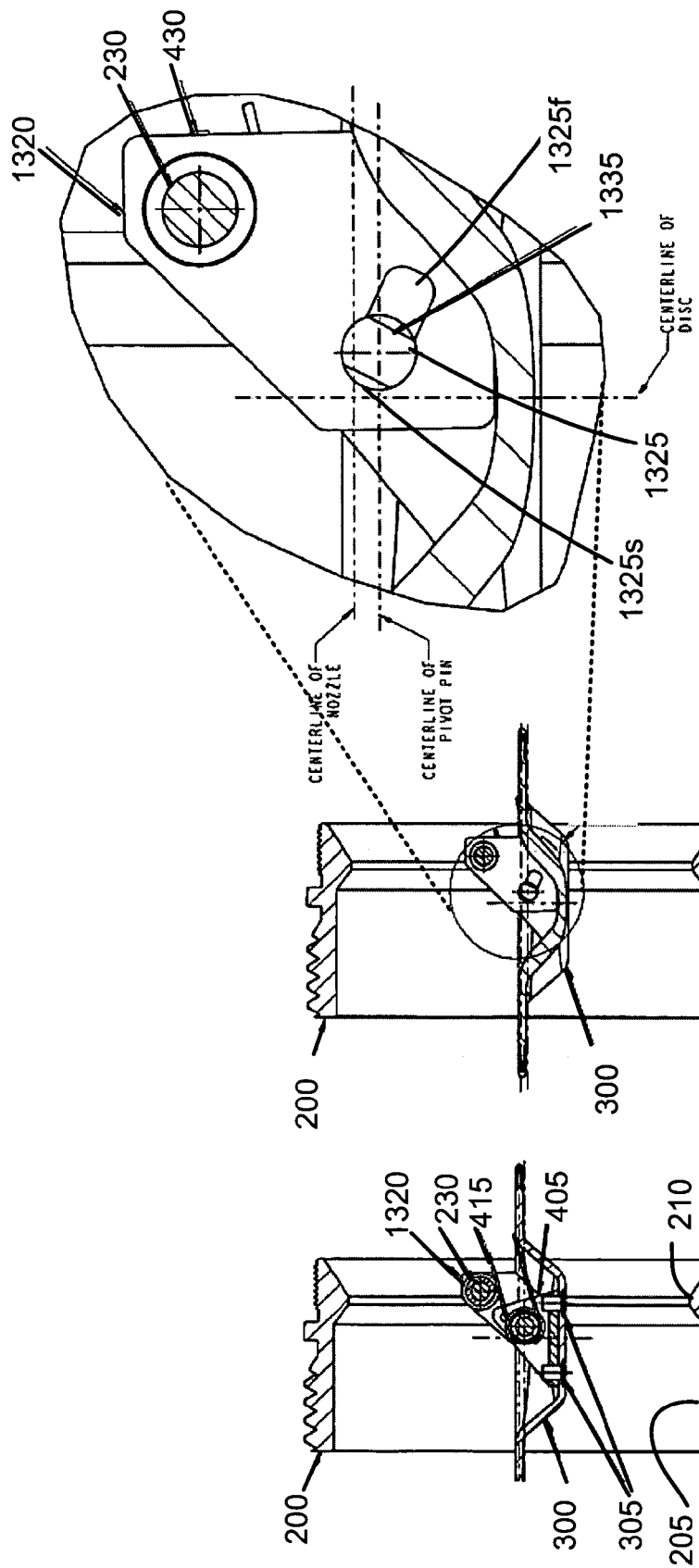

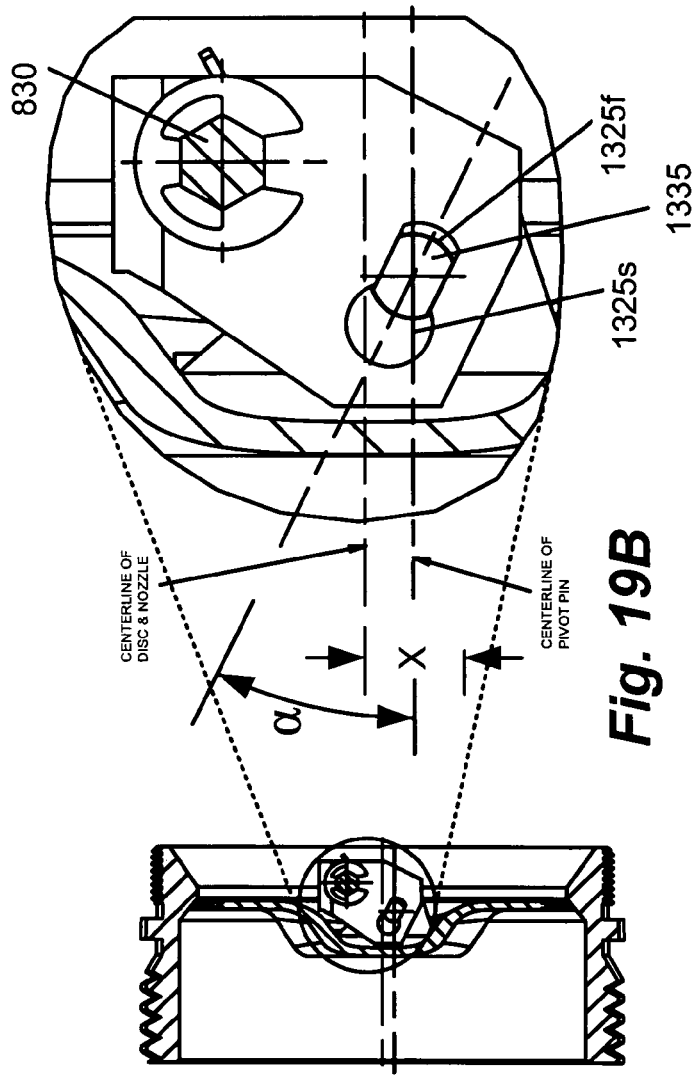
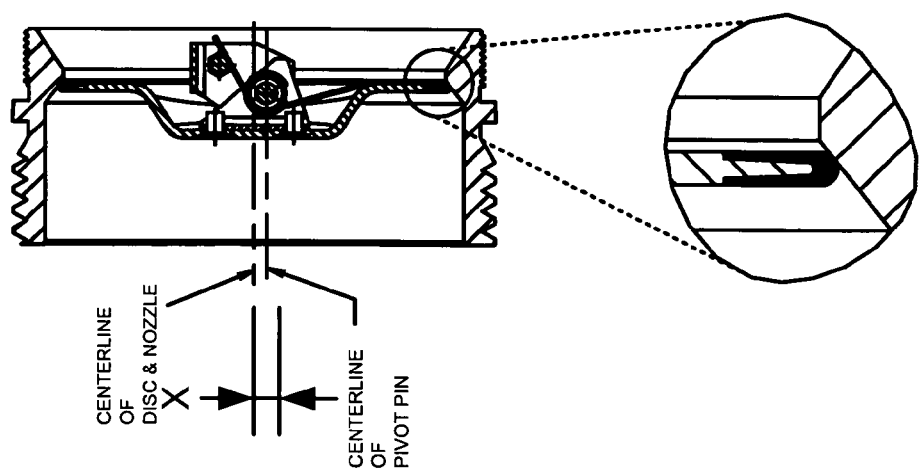
Fig. 19B
Fig. 19A

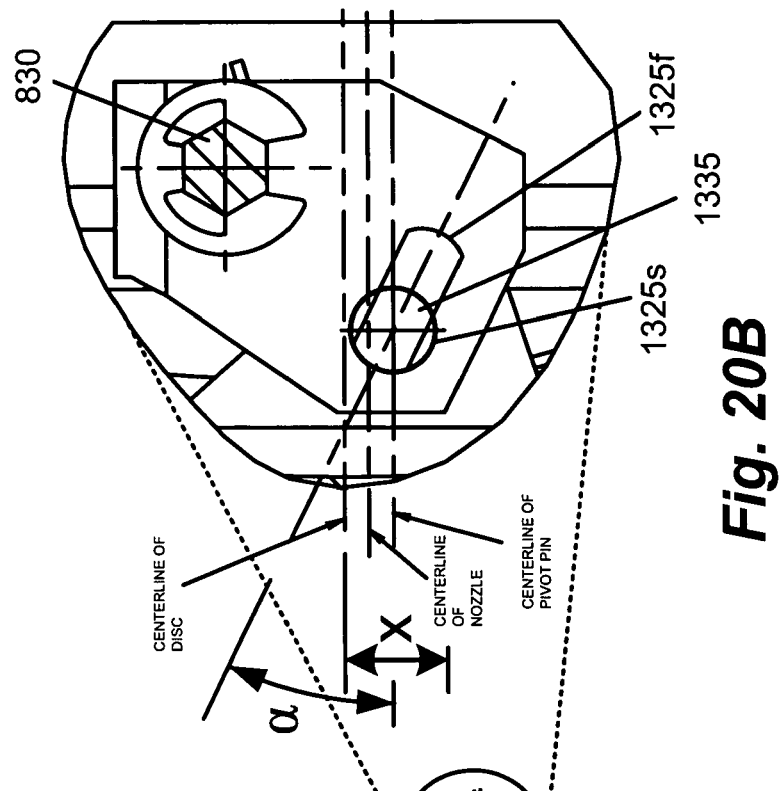
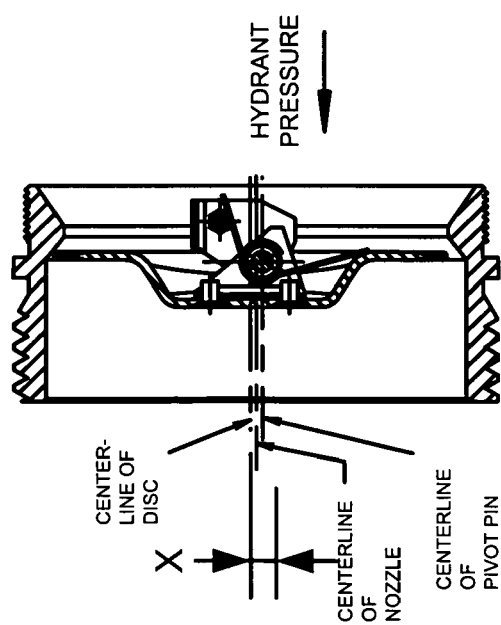
Fig. 20B
Fig. 20A

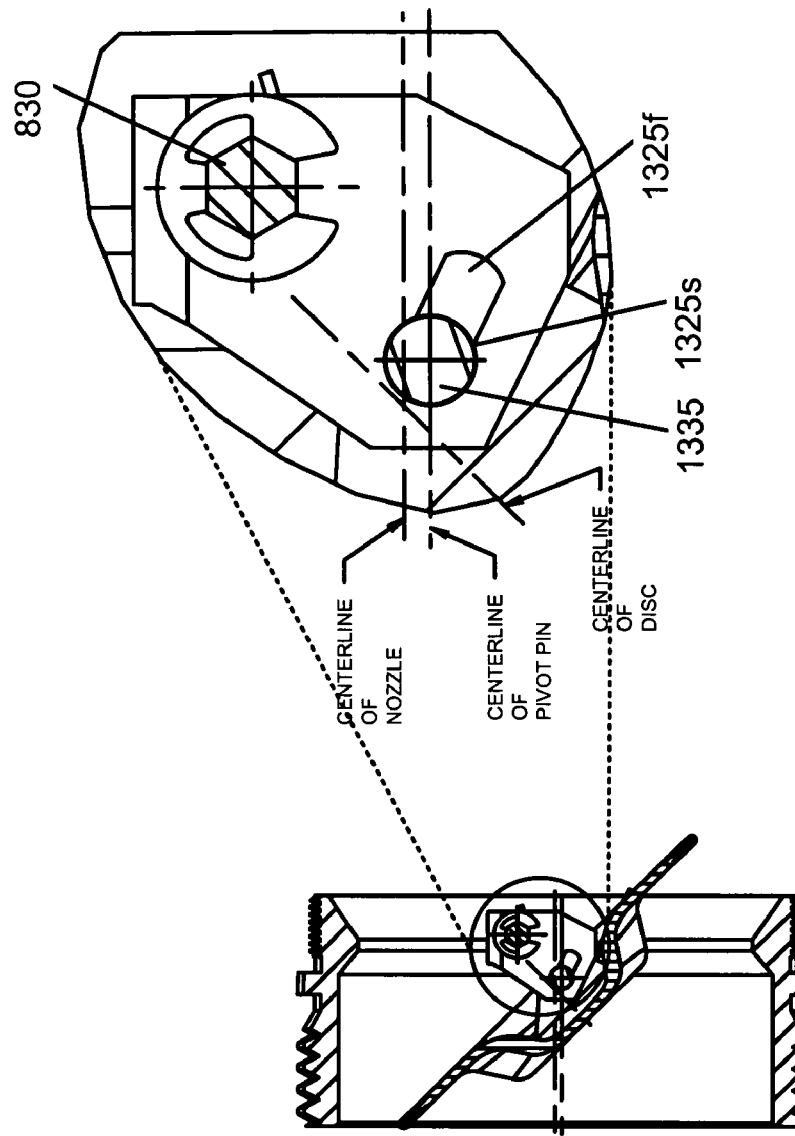
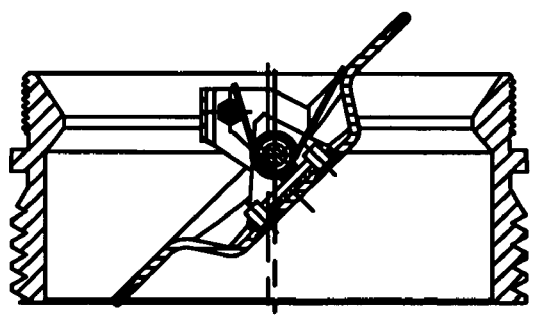
Fig. 21B
Fig. 21A

KEYLESS FIRE HYDRANT PROTECTION SYSTEM

CROSS-REFERENCE TO RELATED APPLICATIONS

This application claims benefit, under 35 U.S.C. § 119(e), of U.S. Provisional Application Ser. No. 60/705,338, filed 4 Aug. 2005, the entire contents and substance of which are hereby incorporated by reference.

FIELD OF THE INVENTION

The present invention relates to a protection system and, more particularly, to a fire hydrant protection system capable of prohibiting access to a water supply in communication with the fire hydrant, while simultaneously providing for the removal of water from the fire hydrant without the need of a special key.

BACKGROUND OF THE INVENTION

Because fire hydrants are located in nearly every neighborhood, sabotage of fire hydrants is simple and common. This becomes a serious issue concerning possible contamination of municipal water supplies. The common approach to protecting municipal water systems includes heightening security at central sites, such as reservoirs, treatment plants, and pumping stations. These measures, however, fail to address the problem of drinking water contamination by terrorists attacking a water supply by means of easily accessible fire hydrants.

The public is typically unaware that fire hydrants are connected to the municipal drinking water system. A hydrant, which is capable of passing hundreds of gallons per minute, provides an easy and effective means of injecting large volumes of chemical contaminants into the water system. Further, since hydrants are located in the communities they serve such acts of terrorism would effortlessly evade any treatment, monitoring, and other protective measures presently in place.

For instance, if a municipal reservoir were to be attacked by chemicals, even in large amounts, the dilution effect would quickly reduce the chemicals' concentration. If, conversely, a large amount of chemicals were dispensed into a municipal fire hydrant, there would be a dangerous consequence. The entire load of chemicals would be quickly distributed in high concentrations throughout the network of the water supply. The effects would be immediate and devastating.

Undoubtedly, hydrant tampering, once merely an act of teenage vandalism, has the potential to become a serious threat to our water systems, worthy of careful consideration.

Conventional methods of protecting fire hydrants require a separate operation to unlock or disarm the protection device of the fire hydrant. Typically, these methods require that fire fighters have possession of a unique key or other device to remove the protection device. Only after the protection device has been removed or disabled are the fire fighters able to connect a fire hose to douse a set of flames.

The problem with conventional fire hydrant protection devices is a result of the protection itself. A fire fighter must carry a key or disabling device to permit access to the water supply being protected. Without the key, the water supply cannot be accessed by the protected hydrant. This can result in a loss of critical time that could be used to extinguish the existing fire. Further, if the protection device is a loose piece which can require refitting, the device may not be recovered and reinstalled until after the emergency is over, thus eliminating the benefit of protecting the hydrant.

Accordingly, an improved fire hydrant protection system is necessary. Furthermore, a fire hydrant having a protection device without the need of a special key or disabling device is essential.

SUMMARY OF THE INVENTION

Generally described, an embodiment of the present invention includes a protection system adapted to protect access to a pipeline, such as in a fire hydrant. The protection system does not require the use of a special key or similar device to disable the protection.

The protection system protects a fire hydrant having an interior. The protection system includes a nozzle, a protection device, and a bracket assembly. The nozzle defines a bore and is in fluid communication with the interior of the fire hydrant. The nozzle is adaptable to receive an end of a fire hose. The rotatable protection device is carried by the bore of the nozzle for prohibiting access into the interior of the fire hydrant from the exterior. The protection device includes a first position for preventing access to the interior of the fire hydrant from the exterior, and a second position wherein water is allowed to flow from the interior of the fire hydrant externally via the nozzle. The bracket assembly is coupled to the protection device for rotating the protection device and carried by the nozzle, wherein the bracket assembly has sufficient rotational travel for enabling the protection device to move from the first position to the second position, depending on the water pressure engaging the bracket assembly.

These and other objects, features, and advantages of the present invention will become more apparent upon reading the following specification in conjunction with the accompanying drawings.

BRIEF DESCRIPTION OF THE DRAWINGS

FIGS. 4A-4B illustrate the fire hydrant protection system in a position at an end of axial movement, in accordance with an embodiment of the present invention.

FIGS. 5A-5B illustrate the fire hydrant protection system in a position at the end of axial movement where a protection device is rotated 45 degrees, in accordance with an embodiment of the present invention.

FIGS. 9A-9B illustrate the fire hydrant protection system in a closed position, in accordance with an embodiment of the present invention.

FIGS. 10A-10B illustrate the fire hydrant protection system in a position at an end of axial movement, in accordance with an embodiment of the present invention.

FIGS. 12A-12B illustrate the fire hydrant protection system in a position at an end of axial movement where the protection device is rotated 90 degrees, in accordance with an embodiment of the present invention.

FIGS. 14A-14B illustrate the fire hydrant protection system in a closed position, in accordance with an embodiment of the present invention.

FIGS. 15A-15B illustrate the fire hydrant protection system in a position at an end of axial movement, in accordance with an embodiment of the present invention.

FIGS. 16A-16B illustrate the fire hydrant protection system in a position at the end of axial movement where a protection device is rotated 45 degrees, in accordance with an embodiment of the present invention.

FIGS. 17A-17B illustrate the fire hydrant protection system in a position at an end of axial movement where the protection device is rotated 90 degrees, in accordance with an embodiment of the present invention.

FIGS. 19A-19B illustrate the fire hydrant protection system in a closed position, in accordance with an embodiment of the present invention.

FIGS. 20A-20B illustrate the fire hydrant protection system in a position at an end of axial movement, in accordance with an embodiment of the present invention.

FIGS. 21A-21B illustrate the fire hydrant protection system in a position at the end of axial movement where a protection device is rotated 45 degrees, in accordance with an embodiment of the present invention.

DETAILED DESCRIPTION OF PREFERRED EMBODIMENTS

To facilitate an understanding of the principles and features of the invention, it is explained hereinafter with reference to its implementation in an illustrative embodiment. In particular, the invention is described in the context of being a fire hydrant protection system.

The invention, however, is not limited to its use as a protection system for a fire hydrant. Rather, the invention can be used wherever a protection system to protect an interior of a pipeline is needed or desired. Alternatively, the protection system can also be used when prevention of gas or liquid backflow is needed or desired. Accordingly, the protection system described hereinafter as a fire hydrant protection system can also find utility as a protection system for purposes other than protecting an interior of a fire hydrant.

The material described hereinafter as making up the various elements of the protection system of the invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example.

The invention provides several preferred embodiments of a protection system having at least a nozzle, a protection device, and a bracket assembly. In use with the fire hydrant, the protection system prohibits undesired access into the interior of the fire hydrant, wherein protecting water supplied to the fire hydrant, and also protecting the placement of undesired objects into the interior of the hydrant, which can cause damage to the fire hydrant or costly delay in attempting to access the water supply.

Figures 1A, 1B:
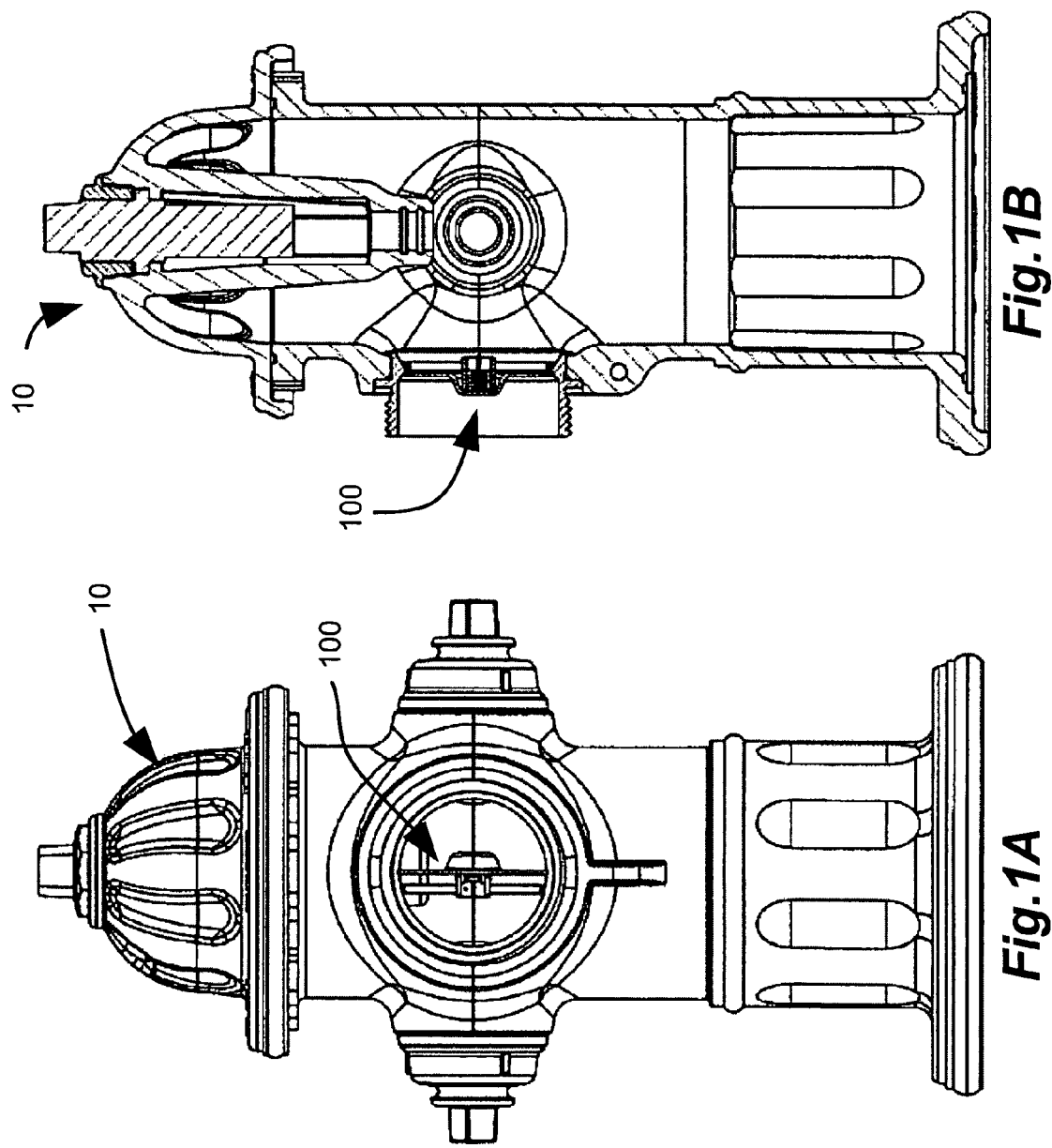
FIGS. 1A-1B illustrate a fire hydrant including a protection system, in accordance with an embodiment of the present invention.

Referring now to the figures, FIGS. 1A-1B illustrate a fire hydrant 10 including a protection system 100, in accordance with an embodiment of the present invention. FIG. 1A is a front perspective view of the fire hydrant 10, and FIG. 1B is a side partial cross-sectional perspective view of the fire hydrant 10. The fire hydrant 10 is an active fire protection measure, and provides a source of water to many urban, suburban, and rural areas to enable firefighters to tap into a municipal water supply to assist with extinguishing fires. Typically, a hose (not depicted) is attached to the fire hydrant 10, and a valve (not depicted) is opened providing a powerful source of water through the fire hydrant 10, and into the attached hose. For the present invention, the fire hydrant 10 can be a conventional fire hydrant tapped to a municipal water supply or like water supply. Due to concerns with security, and the access the fire hydrant 10 has with a municipal water supply, the protection system 100 is carried by the fire hydrant 10.

Figure 2:
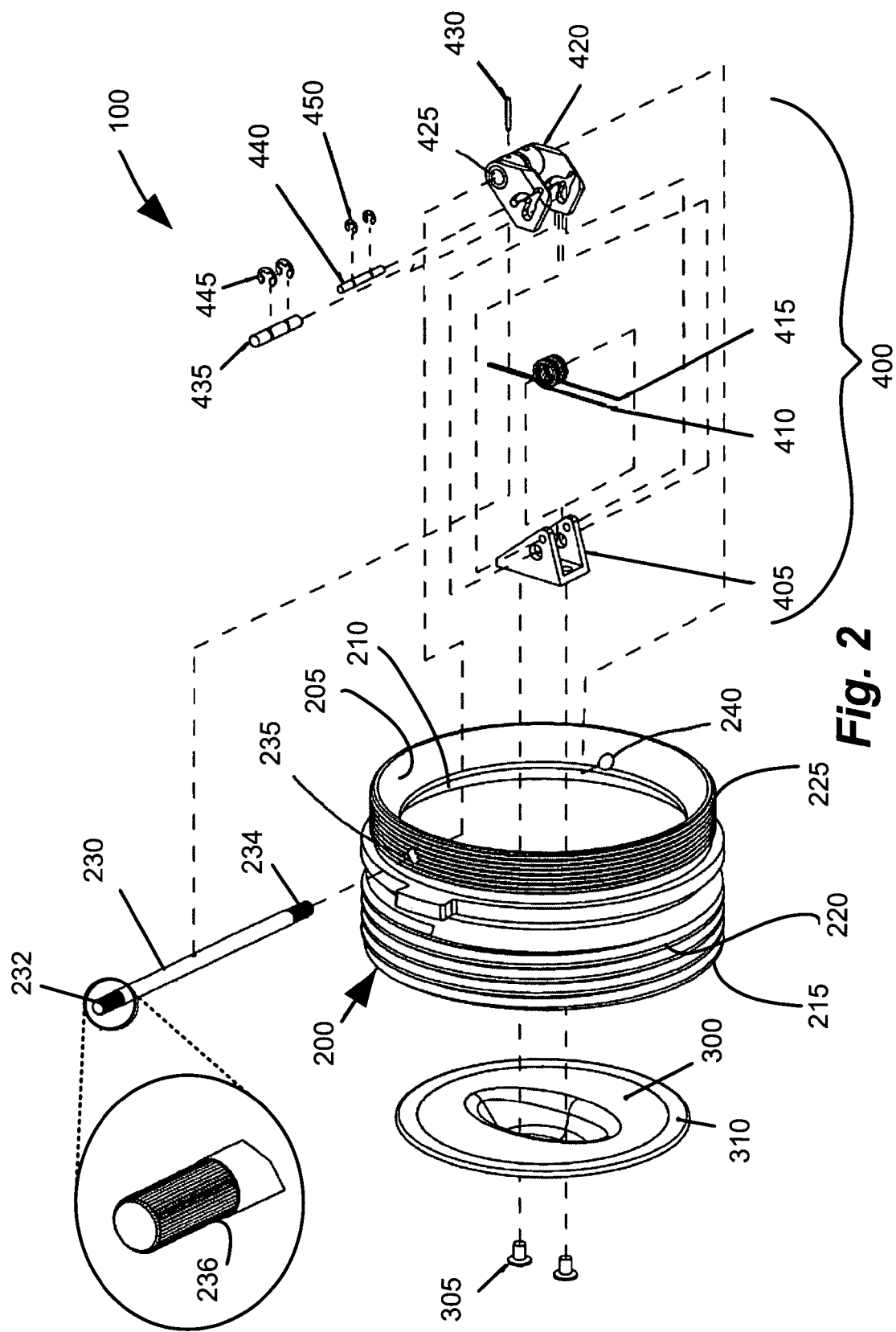
FIG. 2 illustrates an exploded view of the fire hydrant protection system, in accordance with an embodiment of the present invention.

FIG. 2 illustrates an exploded view of the fire hydrant protection system 100, in accordance with an embodiment of the present invention. The fire hydrant protection system 100 includes a nozzle 200 for connecting a fire hose, a protection device 300 carried by the nozzle 200 for preventing access into the fire hydrant, and a bracket assembly 400 coupled to the protection device and for rotating the protection device based on water pressure exiting the fire hydrant 10.

The nozzle 200 can be included in a conventional fire hydrant 10. A fire hose (not depicted) can be adapted to be coupled to the nozzle 200 of the fire hydrant 10 for receiving water from the fire hydrant 10 to douse a set of flames. In an exemplary embodiment, nozzles 200 can have an elongated, cylindrical-like shape. The interior 205 of the cylindrically shaped nozzle 200 can include a tapered portion 210, or a nozzle seat. The exterior 215 of the nozzle 200 can include a first threaded portion 220, as well as a second threaded portion 225. The first threaded portion 220 of the nozzle 200 is connectable to the fire hose. The second threaded portion 225 of the nozzle 200 is connectable to the interior of fire hydrant 10.

Nozzles of a fire hydrant can be replaced based on needs, desire, and/or wear and tear. Thus, the protection system 100 can be integral with new fire hydrants, or be inserted into existing fire hydrants by a replacement method.

The protection device 300 is a barrier that protects the interior of the fire hydrant 10 and, thus, the water supply of the fire hydrant 10 from potential sabotage. The shape of the protection device 300 is dependent on the shape of the interior 205 of the nozzle 200. In an exemplary embodiment, the protection device 300 can have a disc or circular shape, and can have a diameter approximate the size of an inner diameter of the cylindrically-shaped nozzle 200.

The protection device 300, which is carried by the nozzle 200, has different positions based on the amount of water pressure exiting the fire hydrant 10, if any. For example, the protection device 300 can include a first position and a second position. The first position can prevent access to the interior 205 of the fire hydrant 10 from the exterior. That is, the first position enables the protection device 300 to act as a barrier. The second position, however, occurs when water is permitted to flow from the interior 205 of the fire hydrant 10 externally via the nozzle 200. As a result of the water pressure or flow, the protection device 300 can be rotated and water can then flow from the fire hydrant 10 to an outlet. This rotation, or shift from the first position to the second position is dependent on the bracket assembly 400.

In a preferred embodiment, the bracket assembly 400 is coupled to the protection device 300. Indeed, sealed rivets 305 can secure the bracket assembly 400 to the protection device 300. One skilled in the art will appreciate that the bracket assembly 400 and the protection device 300 can be coupled together by many means.

In a preferred embodiment, the bracket assembly 400 comprises at least a fixture 420, a seat spring 410, and a bracket 405. The bracket assembly 400 can be carried by the nozzle 200 and is coupled to the protection device 300. In short, the bracket assembly 400 enables rotation of the protection device 300.

The fixture 420 of the bracket assembly 400 can be a static bracket. The static or fixed characteristic of the fixture 420 is exemplified by connecting a shaft 230 to the fixture 420 to secure the bracket assembly 400 to the nozzle 200. In an exemplary embodiment, the shaft 230 includes opposing ends 232 and 234, and is slidably receivable through at least two holes 235 and 240 of the nozzle 200, and is further receivable by the bracket hole 425 of the fixture 420.

In order to prevent shaft rotation and, thus make the fixture static, the opposing ends 232 and 234 of the shaft 230 can be outfitted with a gripping mechanism 236. Exemplary gripping mechanisms 236 for the opposing ends of the shaft include axial knurls, a hexagonal shape, and the like. One skilled in the art would appreciate that many gripping mechanisms 236 are available for the ends 232 and 234 of the shaft 230 to reduce, if not eliminate, rotation of the shaft 230. Depending on the gripping mechanism 236 selected, the holes 235 and 240 of the nozzle 200 can be outfitted with a particular shape to assist in reducing, if not eliminating, shaft rotation. For example, if the ends 232 and 234 of the shaft 230 include a hex shape, the holes 235 and 240 can include a hex (or hexagonal) shape. In addition, a shaft pin 430 can be included to further limit any rotation of the shaft. The shaft pin 430 is insertable through both the fixture 420 and shaft 230, which further connects the two. With the shaft 230 stable, the fixture 420 of the bracket assembly 400 shall not rotate.

The bracket assembly 400 also includes the bracket 405. The bracket 405, preferably a rotational bracket, is positioned relative to the fixture 420. The bracket 405 can preferably be a bifurcated slot 455 bracket having a first leg 460 and a second leg 465.

In a preferred embodiment, a rotation pin 435 and a slot pin 440, together, can secure the bracket 405 to the fixture 420. Additionally, a plurality of retaining rings 445 and 450 can further secure the pins 435 and 440 in place. The rotation pin 435 can provide a place to seat springs 410 and 415. As a result of the functionality of the pins 435 and 440, the bracket assembly 400 is adapted to enable rotation of the protection device 300 based on water flow out of the fire hydrant.

FIGS. 3A-6B depict the opening of the protection device 300 in the protection system 100 due to a shifting of the bracket assembly 400. These figures illustrate the protection device 300 going from the first position, i.e., closed, to the second position, i.e., open.

Figures 3A, 3B:
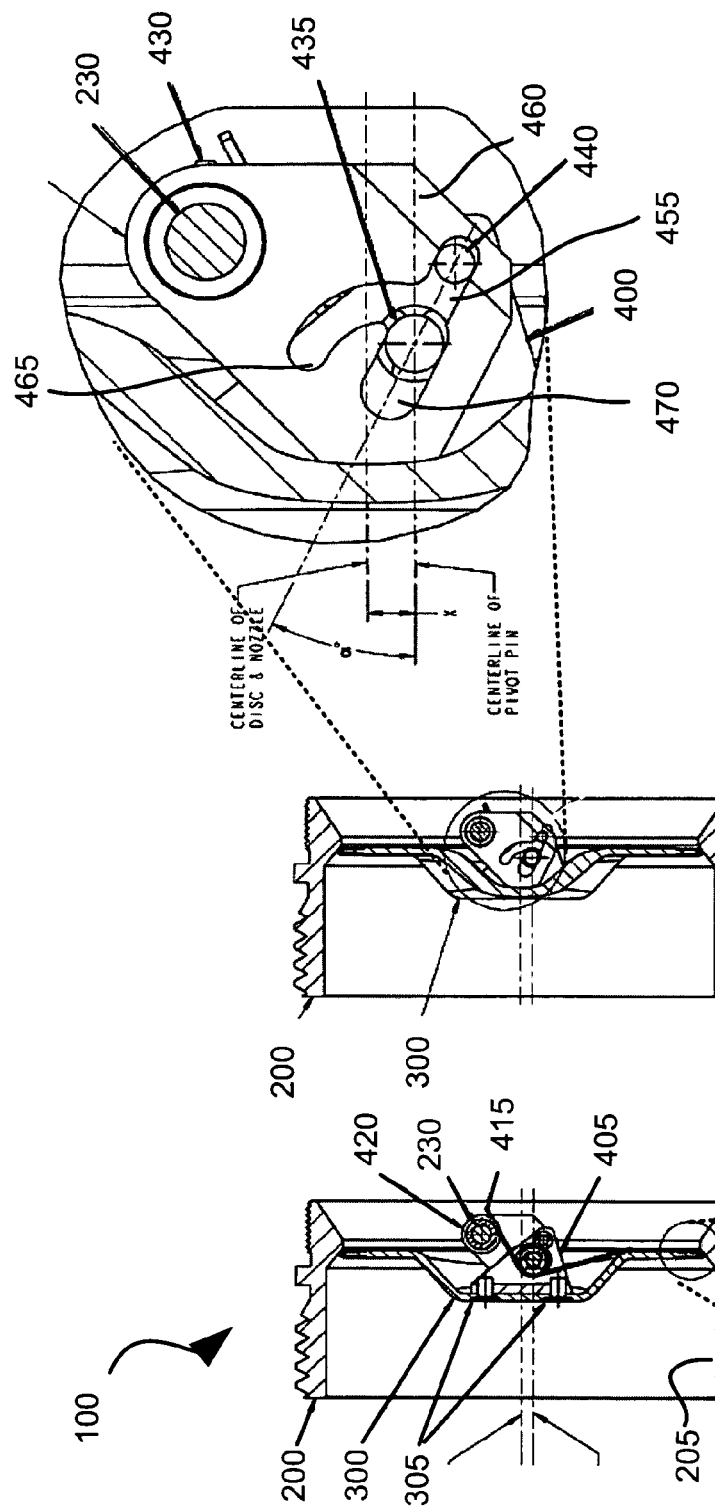
FIGS. 3A-3B illustrate the fire hydrant protection system in a closed position, in accordance with an embodiment of the present invention.

Referring first to FIGS. 3A-3B, cross-sectional views of the fire hydrant protection system 100 are illustrated with the protection device 300 in a closed position, in accordance with an embodiment of the present invention. Specifically, FIG. 3A depicts the protection system 100 in a closed position, wherein water is not flowing in and/or through the fire hydrant 10, and further illustrates a close up of an edge 310 of the protection device 300 sealed to the seat 210 of the nozzle 200, whereas FIG. 3B further illustrates a close up of the bracket assembly 400 in the closed position.

As shown in FIG. 3A, an object from the exterior of the fire hydrant 10, or the left side of FIG. 3A, can not be inserted into the interior of the fire hydrant 10, or the right side of FIG. 3A, because the edge 310 of protection device 300 is flush with seat 210 of the nozzle 200. The protection device 300 acts as a barrier, by only being able to rotate outwardly, and thus does not allow exterior access into the interior of the fire hydrant 10, unless water is flowing outwardly. Due to the construction of the protection device 300 in communication with the bracket assembly 400, the protection device 300 can not be rotated from the left side, or from the exterior of the fire hydrant 10. Additionally, because the edge 310 of the protection device 300 is flush with the seat 210 of the nozzle 200, attempts to open the protection device 300 from the exterior of the fire hydrant fail. There is not enough clearance between the edge 310 and the seat 210 to enable rotation from such an angle. The protection device 300, however, can open, and thus be rotated, by water pressure from the right side of the figure via the bracket assembly 400.

FIG. 3A further depicts a close up of an edge 310 of the protection device 300. The perimeter edge 310 of the protection device 300 is in contact with the inner surface of the nozzle to prohibit access into the interior 205 of the fire hydrant 10. Specifically, the perimeter edge 310 is in contact with the seat 210 of the nozzle 200.

In an exemplary embodiment, protection device 300 can include a molded rubber or like material along its edge 310. When the protection device 300 is in the closed position (i.e., the first position), or not rotated, the edge 310 of the protection device 300 can make complete contact with the seat 210 of the nozzle 200. That is, the edge 310 can be in 360 degrees in contact with the seating surface 210 of the nozzle 200. The seat 210 of the nozzle 200, preferably, can include a metal material. Thus, the rubber edge 205 of the protection device 300 remains in contact with the seat 210 of the nozzle 200 for sealing the protection system 100. Thus, while in the closed position, the protection device 300 exhibits a complete barrier to the interior of the fire hydrant 10.

As illustrated in FIG. 3B, the fixture 420 of the bracket assembly 400 includes a bifurcated slot 455. The bifurcated slot 455 includes two slots or legs that the pin 440 can reside. The bifurcated slot enables the slot pin 440 to be in a locked position in a first leg 460. In this closed position, the protection device 300 is prevented from rotation by both pin 440 of the bracket assembly 400, and the sealed edge 310 of the protection device 300. The pin 440 is engaged in the first leg 460 of the bifurcated slot 455 and can not rotate the fixture 420. Furthermore, the edge 310 of the protection device 300 is sealed to the seat 210 of the nozzle 200.

Furthermore, the protection device 300 is further sealed by the stress exerted by the springs 410 and 415. The springs 410 and 415 create a force great enough to keep the protection device 300 sealed, and for maintaining the contact between the edge 310 of the protection device 300 and the interior 205 of the nozzle 200. In short, this closed position enables the protection device 300 to act similar to a poppet type valve, which seals the internal passage, limited to axial movement.

As water begins to flow out of the fire hydrant, the bracket assembly adjusts and is adapted to enable the protection device to rotate. Referring now to FIGS. 4A-4B the fire hydrant protection system 100 is depicted in a position at an end of axial movement, in accordance with an embodiment of the present invention. Water from the fire hydrant 10 will begin to flow when a valve to the water supply is opened. As water flows from the supply, it enters the interior of the fire hydrant 10. The water flow surges up to exit the interior of the fire hydrant 10 and encounters the protection device 300. Once the pressure of the fire hydrant 10 (depicted with the arrow in FIG. 4A referenced by "hydrant pressure") reaches a predetermined amount, the protection device 300 will move in an axial direction at an angle α to the centerline of the protection device 300 and nozzle 200. The protection device 300, in effect, separates from the nozzle seat 210 to provide the necessary separation between the edge 310 and the seat 210, enabling potential rotation of the protection device 300 with additional water pressure.

The water pressure of the fire hydrant 10 opens the protection device 300 at the end of the axial travel. FIG. 4A illustrates the separation 500 of the edge 310 of protection device 300 from the interior 205 tapered portion 210 (or seat) of the nozzle 200. This separation 500 can enable, depending on the amount of water pressure, the protection device 300 to eventually rotate.

The pin 440 of the bracket assembly 400 travels in an axial direction to generate the separation 500 of the protection device 300 from the tapered portion 210 of the nozzle 200. Due to the water pressure, the pin 440 can move as far as the rotation pin 435 in the pivot slot 470 will allow. The movement of pins 435 and 440 are at a specific offset angle, α°, to the axis of the nozzle 200.

When the rotation pin 435 reaches the end of the pivot slot 470, the pin 440 can be aligned with the radial offshoot of the bifurcated slot 455 or the second leg/slot 465 in the fixture 420.

The rotational force that is provided by the water pressure from the fire hydrant can provide a torsional movement as the pivot pin 435 of the protection device 300 is offset by distance x of the center of the protection device 300.

Next, FIGS. 5A-5B illustrate cross-sectional views of the fire hydrant protection system 100 in a position at the end of axial movement where the protection device 300 is rotated approximately 45 degrees, in accordance with an embodiment of the present invention. FIGS. 5A-5B illustrate the protection device 300 rotated approximately 45 degrees about the pivot pin 435. As the protection device 300 rotates, the pin 440 leaves the first slot 460. Then, due to increased water pressure, when pivot rotational pin 435 reaches the end of the pivot slot 470, the pin 440 begins to enter the second slot 465. The larger the angle of rotation of the protection device 300, the farther into the second slot 465 the pin 435 can travel. The springs 410 and 415 are progressively wound up by this rotation storing energy to return the protection device 300 to the closed position when the fire hydrant 10 is closed, i.e., when there is no water pressure.

Figure 6B:
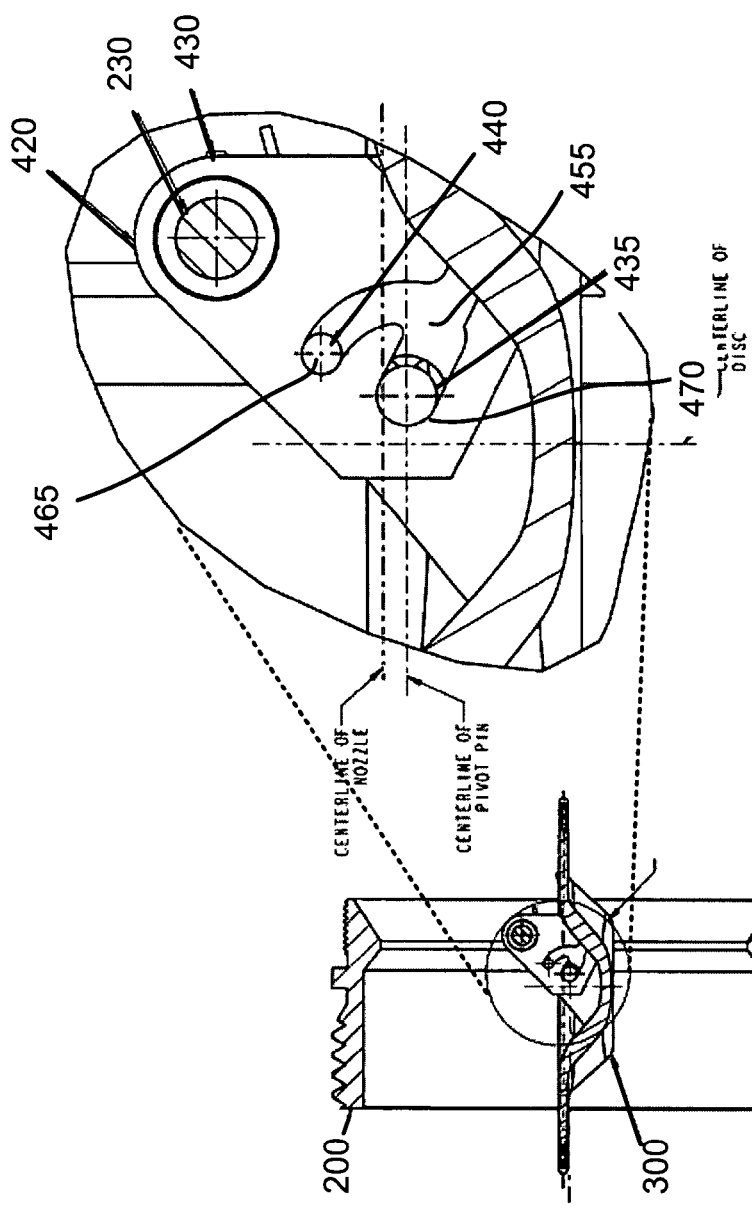
FIGS. 6A-6B illustrate the fire hydrant protection system in a position at an end of axial movement where the protection device is rotated 90 degrees, in accordance with an embodiment of the present invention.
Figure 6A:
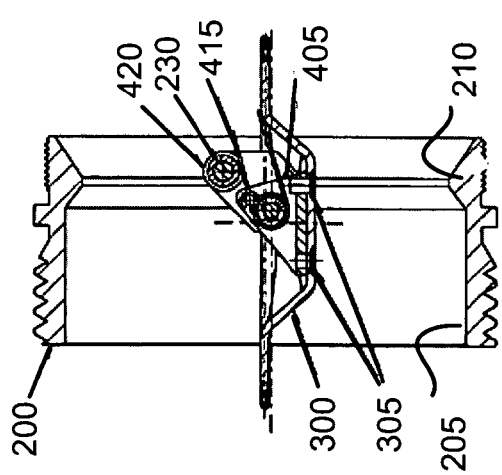

FIGS. 6A-6B illustrate cross-sectional views of the fire hydrant protection system 100 in a position at the end of axial movement where the protection device 300 is fully open, or rotated approximately 90 degrees, in accordance with an embodiment of the present invention. The protection device 300 is shown fully open with pin 440 at the termination of the second slot 465 of fixture 420, preventing over-travel. As a result of the protection device 300 being rotated approximately 90 degrees, or being full open, water can flow through the fire hydrant 10 at the strongest pressure and lowest head loss. Because the slot pin 440 has traveled as far as the second leg 460 permits, the protection device can not travel any further.

Figure 7:
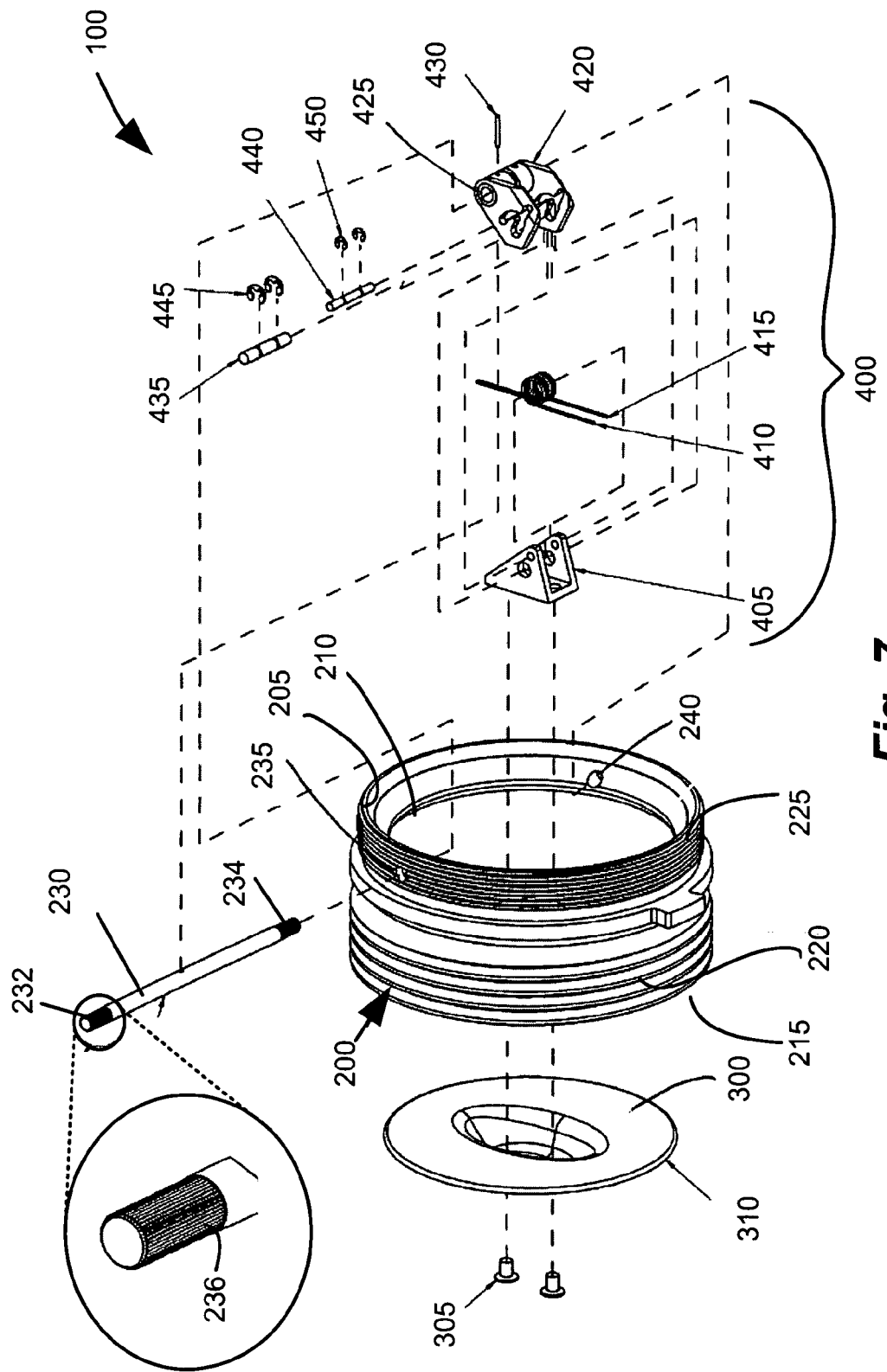
FIG. 7 illustrates an exploded view of the fire hydrant protection system, in accordance with another embodiment of the present invention.

FIG. 7 depicts an exploded view of the fire hydrant protection system 100, in accordance with another embodiment of the present invention. The fire hydrant protection system 100 includes the protection device 300 composed of a metal material, including the edge 310 being metal, whereas the interior 205, preferably the seat 210, of the nozzle 200 includes a bore of a rubber-like material. This arrangement also seals the protection device 300 within the nozzle 200. The operation of the protection system 100 illustrated in FIG. 7 operates the same as FIGS. 3A-6B, as described and depicted.

Figure 8:
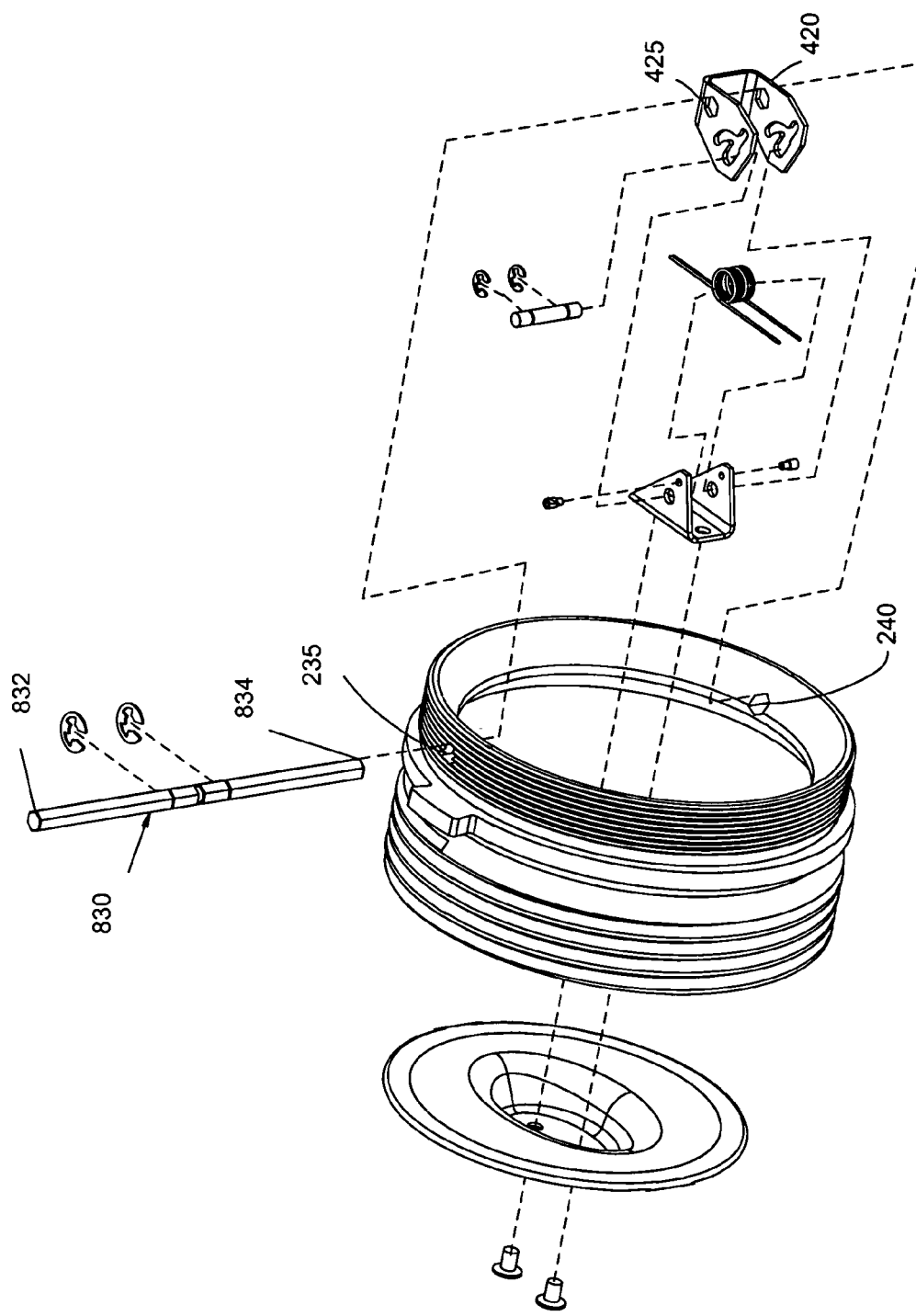
FIG. 8 illustrates an exploded view of a fire hydrant protection system, in accordance with yet another embodiment of the present invention.
Figure 11B:
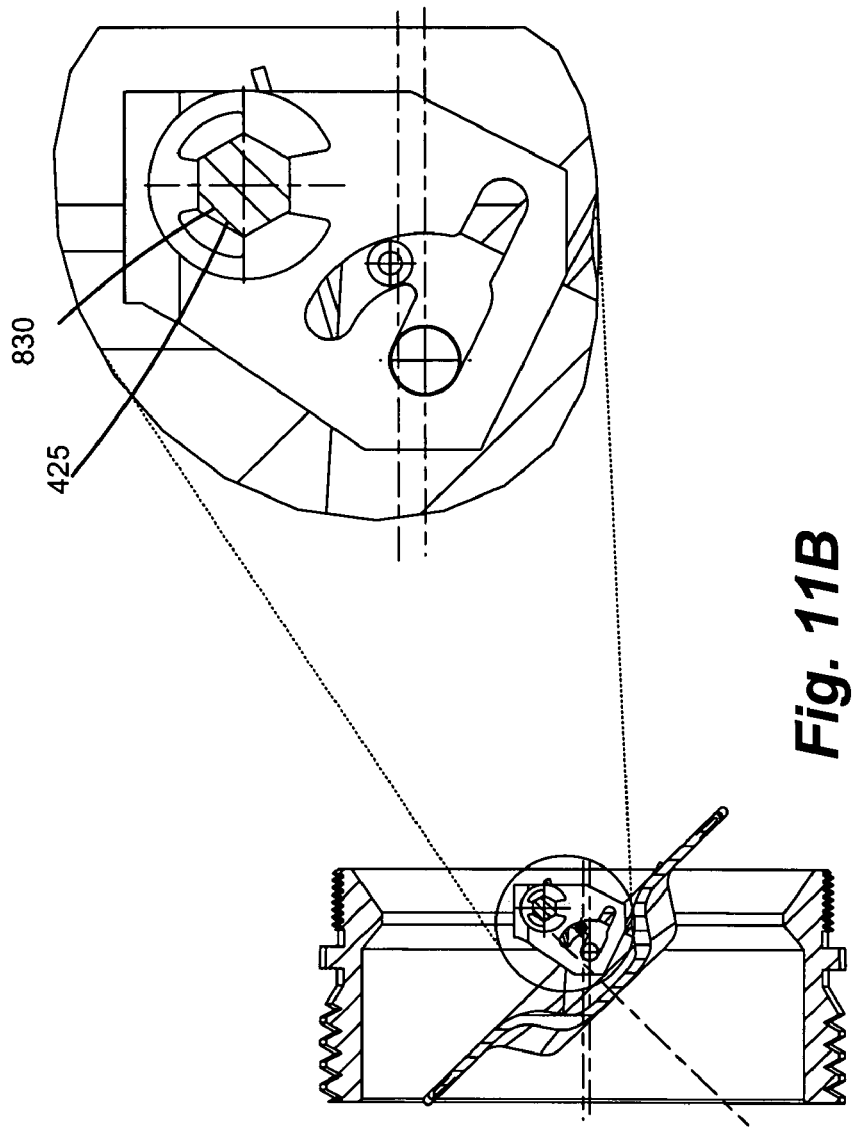
FIGS. 11A-11B illustrate the fire hydrant protection system in a position at the end of axial movement where a protection device is rotated 45 degrees, in accordance with an embodiment of the present invention.
Figure 11A:
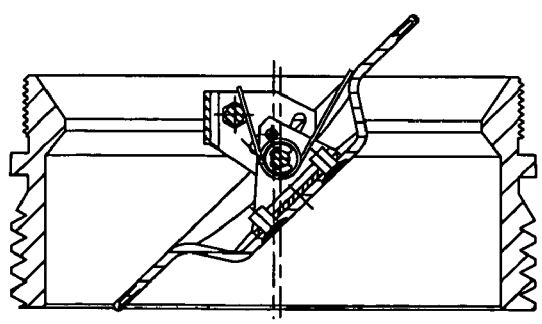

Referring now to FIG. 8 an exploded view of the protection system 100 is depicted, in accordance with another embodiment of the present invention. In this embodiment, the protection system operates in the same manner as described and depicted in FIGS. 3A-6B, but includes a shaft 830 having a hexagonal shape. The shaft 830 has opposing ends 832 and 834, and can be insertable into holes 235 and 240 of the nozzle 200, as well as the hole 425 of the fixture 420. The holes 235, 240, and 425 have a hexagonal shape to cooperatively receive the hexagonal shaped ends 832 and 834 of the shaft 830, and prevent rotation of the shaft 830.

FIGS. 9A-12B illustrate the same rotation views of the protection system 100 as FIGS. 3A-6B, respectively, but replaces the shaft 230 with the hexagonal shaped shaft 830 and hexagonal shaped holes 235, 240, and 425.

Figure 13:
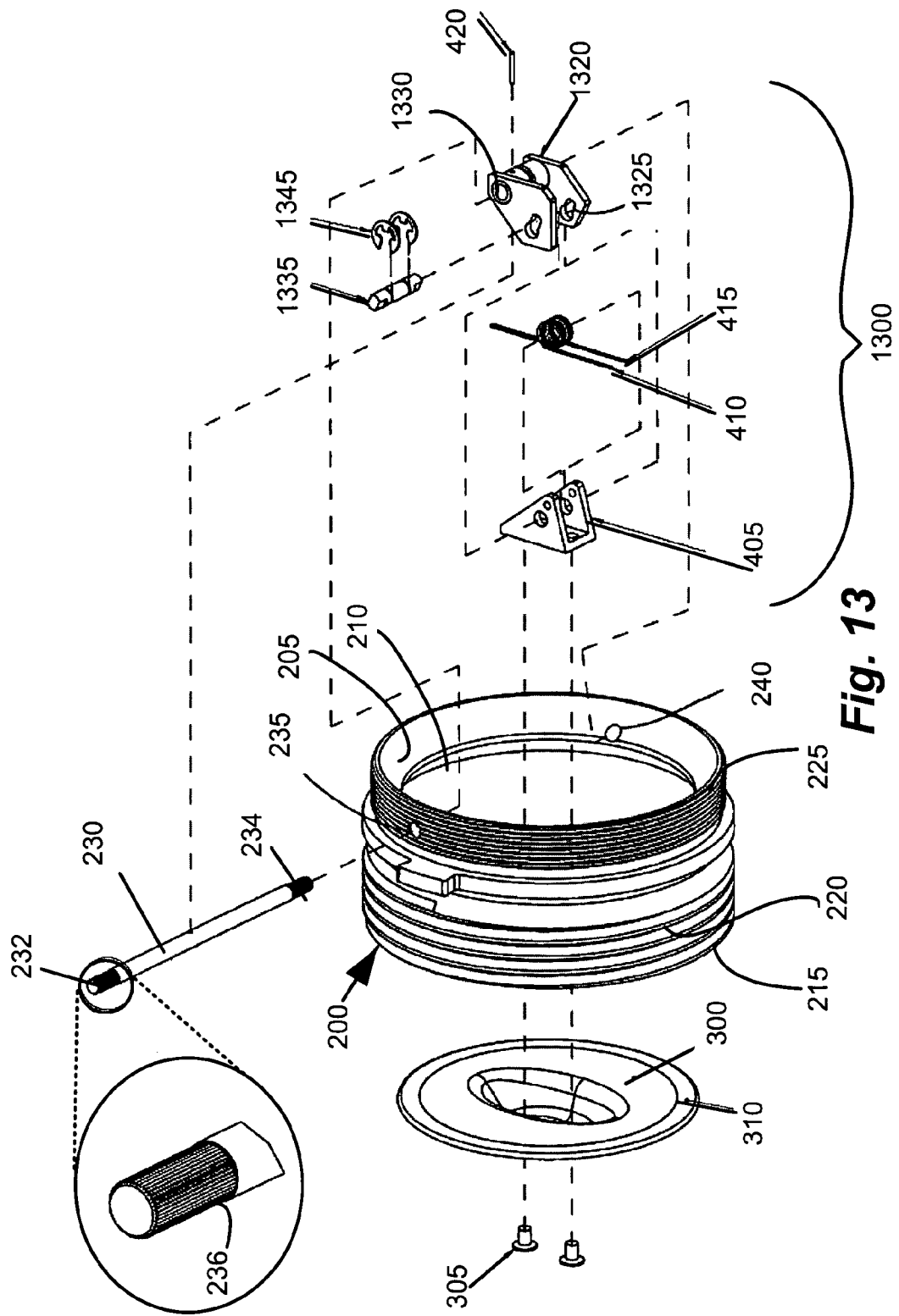
FIG. 13 illustrates an exploded view of a fire hydrant protection system, in accordance with yet another embodiment of the present invention.

FIG. 13 illustrates an exploded view of the protection system 100, in accordance with yet another embodiment of the present invention. The protection system 100 can include a different shaped bracket assembly 1300. In this embodiment, a double D bracket for a fixture 1320 can be implemented. The bracket assembly 1300 includes the fixture 1320, at least one spring 410, and bracket 405.

In an exemplary embodiment of the present invention, the bracket assembly 1300 is coupled to the protection device 300. A plurality of sealed rivets 305 can attach the bracket 405 of the bracket assembly 1300 to the protection device 300.

The bracket assembly 1300 includes the fixture 1320. The fixture 1320 is carried by the nozzle 200 and can be secured to the nozzle 200 by the shaft 230. The shaft 230 is slidable through at least two holes 235 and 240 of the nozzle 200 and through the set of bracket holes 1330 of the fixture 1320, thus securing the fixture 1320 to the nozzle 200. The shaft 230 prevents the protection device 300 from rotating by a set of axial knurls 236 of opposing ends 232 and 234 of the shaft 230. The bracket assembly 1300 is further prevented from rotation by pin 420 that can be inserted through the fixture 1325 and shaft 230.

The axial/rotary protection device 300 motion is controlled by a single parallel sided slot terminating in a circular aperture or slot 1325 of fixture 1320. The pivot pin 1335 is located in fixture 1320 by retaining rings 1345. The pivot pin 1335, further, has two flats guided axially in the slot 1325. This travel is offset at a specific angle, α°, to the axis of the nozzle 200.

At this point, the pin 1335 is free to rotate without contacting the interior 205 of the nozzle 200, while still minimizing the amount of axial movement required to achieve rotation of the protection device 300. A set of pretensioned springs 410 and 415 can be loaded to provide energy to return the protection device 300 to the closed position, when the fire hydrant 10 is turned off, i.e., there no water pressure.

FIGS. 14A-14B depict cross-sectional views of the protection system 100, wherein the protection device 300 is in a closed position, in accordance with an embodiment of the present invention. FIG. 14B illustrates a cross-sectional view of the protection system 100, with a close up of the bracket assembly 1300. The pin 1335 of the fixture 1320 is in a first slot 1325*f* of slot 1325. In the first slot 1325*f*, the protection device 300, which is coupled to the bracket assembly 1300, can not rotate, and thus no water is flowing. Not only does the pin 1335 prohibit rotation of the protection device 300, but the edge 310 of the protection device is in contact with the seat 210.

FIGS. 15A-15B depict cross-sectional views of the protection system 100, wherein the protection device 300 is in a position at an end of axial movement, in accordance with embodiments of the present invention. Water from the fire hydrant 10 will begin to flow when a valve to the water supply is opened. As water flows from the supply, it enters the interior of the fire hydrant 10. The water flow surges up to exit the interior of the fire hydrant 10 and encounters the protection device 300. Once the pressure of the fire hydrant 10 reaches a predetermined amount, the protection device 300 will move in an axial direction along the centerline of the protection device 300 and nozzle 200. This axial direction of the protection device creates a separation between the edge of the protection device and the seat of the nozzle.

The water pressure of the fire hydrant 10 opens the protection device 300 at the end of the axial travel. FIG. 15A shows the separation 500 of the edge 310 of protection device 300 from the interior 205 tapered portion 210 of the nozzle 200. This separation 500 can enable, depending on the amount of water pressure, the protection device 300 to eventually rotate.

FIG. 15B illustrates the shift of the pin 1335 from the first slot 1325*f* of the slot 1325 to a second slot 1325*s* of the slot 1325. Due to the shape of the pin 1335 with respect to the shape of the slot 1325*f*, rotation of the protection device 300 can not occur. When the pin 1335 shifts to the second slot 1325*s*, pressure exerted on the right side of the protection device 300, or the interior side of the protection device 300 can enable the protection device 100 to rotate.

FIGS. 16A-16B illustrate cross-sectional view of the fire hydrant protection system 100 in a position at the end of axial movement where the protection device 300 is rotated approximately 45 degrees, in accordance with an embodiment of the present invention. FIGS. 16A-16B illustrate the protection device 300 rotated approximately 45 degrees about the pivot pin 1335. As the protection device 300 rotates, pin 1335 rotates within second slot 1325*s*. The larger the angle of rotation of the protection device 300, the more the pin 1335 rotates while within the second slot 1325*s*. The springs 410 and 415 are progressively wound up by this rotation storing energy to return the protection device 300 to the closed position when the fire hydrant 10 is closed, i.e., when there is no water pressure.

FIGS. 17A-17B illustrate the fire hydrant protection system 100 in a position at the end of axial movement where the protection device 300 is fully open, or rotated approximately 90 degrees, in accordance with an embodiment of the present invention. The protection device 300 is shown fully open with pin 1335 at the termination of the second slot 1325*s* of fixture 1320. As a result of the protection device 300 being rotated approximately 90 degrees, or being full open, water can flow through the fire hydrant 10 at the strongest available pressure.

Figure 18:
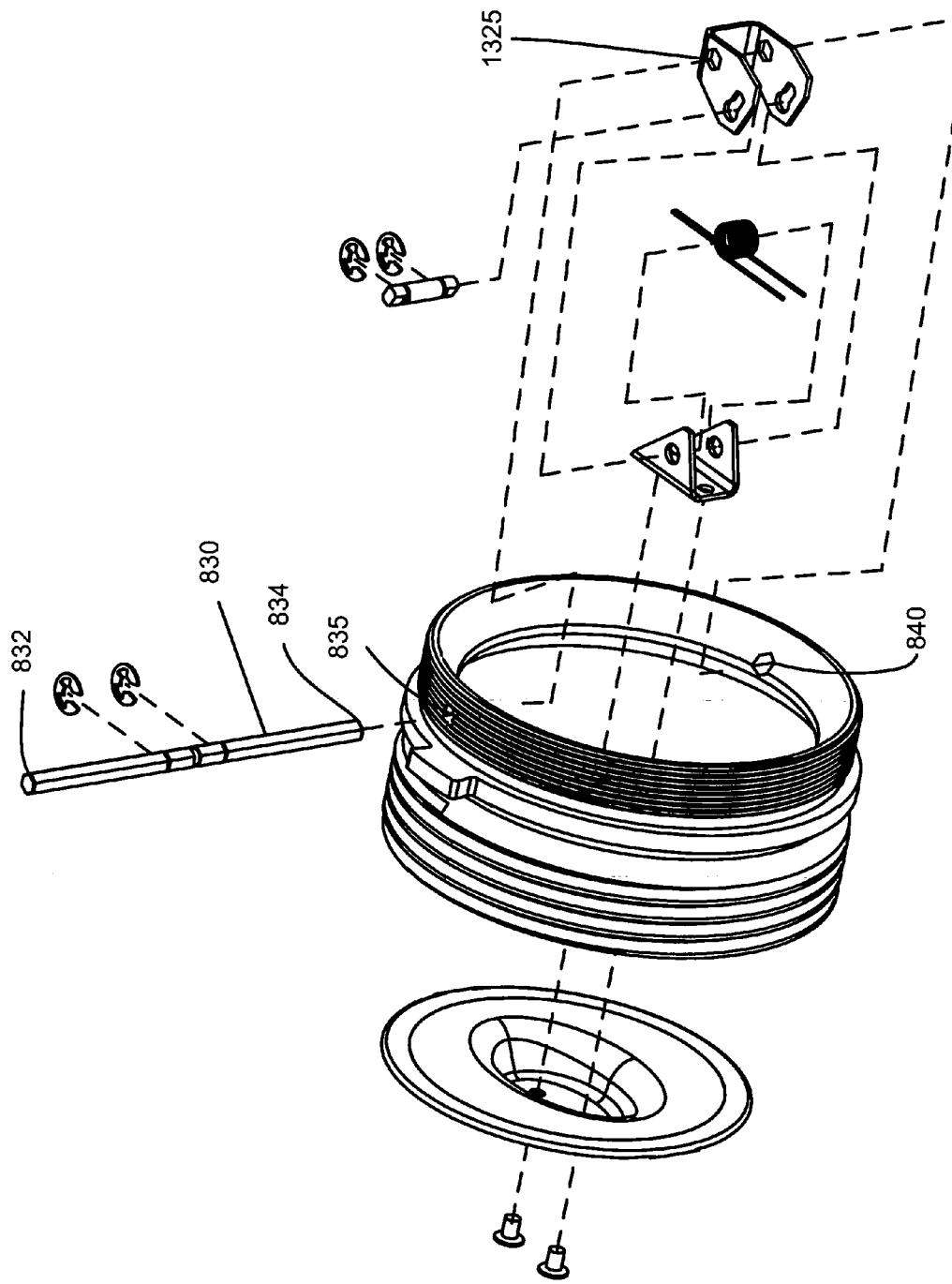
FIG. 18 illustrates an exploded view of a fire hydrant protection system, in accordance with another embodiment of the present invention.
Figure 22B:
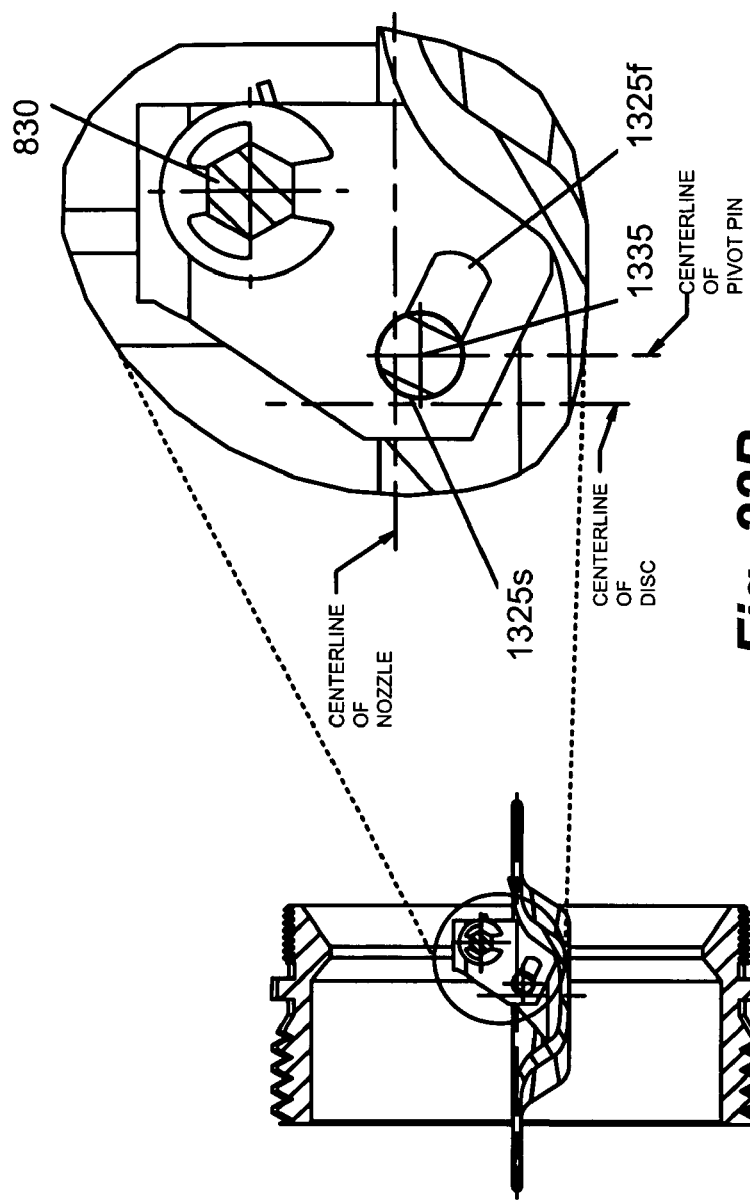
FIGS. 22A-22B illustrate the fire hydrant protection system in a position at an end of axial movement where the protection device is rotated 90 degrees, in accordance with an embodiment of the present invention.
Figure 22A:
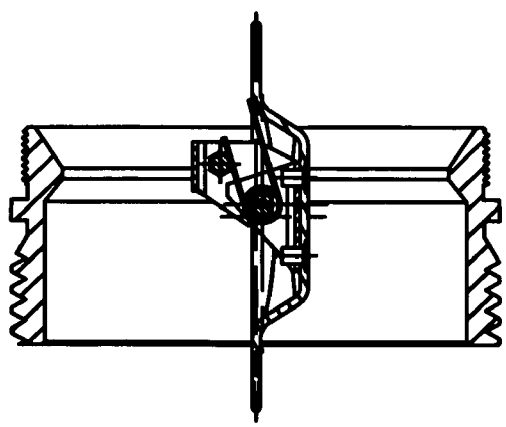

Referring now to FIG. 18 an exploded view of the protection system 100 is depicted, in accordance with another embodiment of the present invention. In this embodiment, the protection system operates in the same manner as described and depicted in FIGS. 14A-17B, but includes a shaft 830 having a hexagonal shape. The shaft 830 has opposing ends 832 and 834, and can be insertable into holes 835 and 840 of the nozzle 200, as well as the hole 1325 of the fixture 420. The holes 235, 240, and 425 shall have a hexagonal shape to cooperatively receive the hexagonal shaped ends 832 and 834 of the shaft 830, and prevent rotation of the shaft 830.

FIGS. 19A-22B illustrate the same rotation views of the protection system 100 as FIGS. 14A-17B, respectively, but replaces the shaft 230 with the hexagonal shaped shaft 830 and hexagonal shaped holes 235, 240, and 425.

Accordingly, in operation, an innovative solution exists for protecting fire hydrants. After the fire hydrant valve is opened, water surges into the interior of the fire hydrant. As the water supply enters the interior of the fire hydrant the pressure of the water increases. A pre-positioned protection device can be carried by the nozzle to act as a barrier to the interior of the fire hydrant. The protection device is adapted to rotate based on a bracket assembly.

In one embodiment, the bracket assembly includes the fixture of the bracket assembly having a first leg and a second leg. When there is no water pressure, or the protection device is closed, and the slot pin rests in the first leg. When water pressure increases, the slot pin is adapted to shift from the first leg to the second leg of the bifurcated slot. As this shift of the slot pin occurs, the protection device can rotate.

In a first position of the protection device, when there is no water pressure flowing from the interior of the fire hydrant, the slot pin of the bracket assembly remains in the first leg, leaving the protection device closed and the barrier in place. The protection device remains closed due to (i) the edges of the protection device in contact with the seat of the nozzle, (ii) the slot pin position in the first leg of the bifurcated slot, and (iii) the force generated by the springs.

When water begins to flow, however, the slot pin of the bracket assembly moves in an axial direction along the first leg. In response, the rotational pin shifts to the end of the pivot slot. When the pivot pin reaches the end of the pivot slot, the slot pin is aligned with the entry of the second leg of the bifurcated slot. Consequently, the protection device moves in the axial direction, and is no longer sealed along its edge to the inner circumference of the nozzle creating a separation between the edge and the seat. This separation is sufficient to enable the protection device enough clearance to rotate under additional pressure As the water pressure increases, the protection device is now adapted to rotate. Because the slot pin is aligned with the second leg of the bifurcated slot, and the rotation pin is at the terminus of the rotation slot, the slot pin enters the second leg as the pressure increases. Shifting of the slot pin from the first bifurcated slot into the second bifurcated slot now enables the protection device to rotate. The rotation of the protection device is limited by the length of the second slot. In a preferred embodiment, the second leg of the bifurcated slot enables the protection device to rotate approximately 90 degrees. Accordingly, depending on the amount of water pressure, the bracket assembly is adapted to enable the protection device to rotate between approximately 0 degrees, in a closed position, and approximately 90 degrees, in a fully open position.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A protection system for protecting a fire hydrant having an interior, the protection system comprising:
   a nozzle defining a bore and in fluid communication with the interior of the fire hydrant, the nozzle adaptable to receive an end of a fire hose;
   a rotatable protection device housed within the bore of the nozzle for prohibiting access into the interior of the fire hydrant from an exterior, the protection device having a first position preventing access to the interior of the fire hydrant from the exterior, and the protection device having a second position wherein water is allowed to flow from the interior of the fire hydrant externally via the nozzle; and
   a bracket assembly coupled to the protection device for rotating the protection device, the bracket assembly carried by the nozzle,
   wherein the bracket assembly has sufficient rotational travel for enabling the protection device to move from the first position to the second position, depending on the water pressure engaging the bracket assembly and
   wherein the bracket assembly includes:
   a bracket coupled to the protection device and including a first pin and a second pin;
   a fixture in communication with the nozzle for securing the bracket assembly within the nozzle, the fixture including a bifurcated slot that restricts movement of the first and second pin to control rotation of the protection device, wherein the first pin moves from a first leg of the bifurcated slot to a second leg of the bifurcated slot depending on the water pressure; and
   a spring mechanism coupled to the fixture for generating a force to rotate the protection device from the second position to the first position when the water pressure decreases.

2. The protection system according to claim 1, wherein the fixture of the bracket assembly includes:
   a first position with no water pressure, the first position preventing access to the interior of the fire hydrant and the first pin remains in the first leg of the bifurcated slot;
   a second position where the fixture enables an edge of the protection device to move in an axial direction due to water flow, and the first pin remains in the first leg of the bifurcated slot; and
   a third position where the protection device is adapted to rotate and the first pin is in the second leg of the bifurcated slot.

3. The protection system according to claim 1, further including a shaft having opposing ends that are carried by the nozzle for fixing the bracket assembly within the nozzle, the opposing ends of the shaft having a gripping mechanism for preventing movement of the bracket assembly.

4. The protection system according to claim 1, wherein the bracket assembly is adapted to rotate the protection device from approximately 0 degrees to approximately 90 degrees, according to the amount of water pressure.

5. The protection system according to claim 1, wherein the protection device prohibits backflow into the interior of the fire hydrant.

6. A protection system for protecting a pipe having a cross section and an elongated body, the protection system comprising:
   a bracket assembly carried by the pipe; and
   a protection device coupled to the bracket assembly, wherein the bracket assembly rotates the protection device from a first position when media does not flow in the pipe to a second position when media does flow in the pipe,
   wherein, in first position, the protection device creates a barrier from an exterior of the pipe to the interior of the pipe for protecting the interior, and
   wherein the bracket assembly includes:
   a bracket coupled to the protection device and including a first pin and a second pin;
   a fixture in communication with the pipe for securing the bracket assembly within the pipe, the fixture including a bifurcated slot that restricts movement of the first and second pin to control rotation of the protection device, wherein the first pin moves from a first leg of the bifurcated slot to a second leg of the bifurcated slot depending on the media flow; and
   a spring mechanism coupled to the fixture for generating a force to rotate the protection device from the second position to the first position when media flow decreases.

7. The protection system according to claim 6, wherein the first position of the protection device is positioned perpendicular to the cross section of the pipe.

8. A protection system for protecting a pipe having a cross section and an elongated body, the protection system comprising:
   a bracket assembly carried by the pipe; and
   a protection device coupled to the bracket assembly, wherein the bracket assembly rotates the protection device from a first position when media does not flow in the pipe to a second position when media does flow in the pipe,
   wherein, in first position, the protection device creates a barrier from an exterior of the pipe to the interior of the pipe for protecting the interior, and wherein the bracket assembly includes a double D bracket slot comprising a parallel sided slot terminating in a circular aperture.

* * * * *